United States Patent
Clerckx et al.

(10) Patent No.: US 8,050,357 B2
(45) Date of Patent: Nov. 1, 2011

(54) CODEBOOK GENERATING METHOD AND APPARATUS FOR GENERATING A CODEBOOK FOR MULTI-POLARIZED MULTIPLE-INPUT MULTIPLE-OUTPUT (MIMO) SYSTEMS

(75) Inventors: Bruno Clerckx, Yongin-si (KR); Yongxing Zhou, Yongin-si (KR); Goo Chul Chung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 938 days.

(21) Appl. No.: 12/025,910

(22) Filed: Feb. 5, 2008

(65) Prior Publication Data
US 2008/0186212 A1 Aug. 7, 2008

Related U.S. Application Data

(60) Provisional application No. 60/899,634, filed on Feb. 6, 2007, provisional application No. 60/929,032, filed on Jun. 8, 2007.

(30) Foreign Application Priority Data

Mar. 23, 2007 (KR) .......... 10-2007-0028878
Sep. 19, 2007 (KR) .......... 10-2007-0095490

(51) Int. Cl.
*H04L 27/04* (2006.01)
(52) U.S. Cl. .................................... 375/299
(58) Field of Classification Search .......... 375/299, 375/267
See application file for complete search history.

(56) References Cited

U.S. PATENT DOCUMENTS

| 7,006,804 B1 | 2/2006 | Clark et al. |
| 2007/0064830 A1* | 3/2007 | Choi et al. .......... 375/267 |
| 2008/0080632 A1 | 4/2008 | Kim et al. |

FOREIGN PATENT DOCUMENTS

| KR | 10-2006-0047746 | 5/2006 |
| WO | WO 02/054626 | 7/2002 |

OTHER PUBLICATIONS

Lee Sang-Yup. et al. "*Transmit Antenna Selection for Dual Polarized Channel Using Singular Value Decision*," Korea Information and Communications Society, Sep. 2006, vol. 30, No. 9A, pp. 788-794, ISSN : 1226-4717.
"3rd Generation Partnership Project; Technical Specification Group Radio Access Network; Evolved Universal Terrestrial Radio Access (E-UTRA); Physical channels and modulation (Release 8)," *3GPP TS 36.211*, 2007, pp. 1-50.
"Precoding for 4-Tx Polarized Antennas," *3GPP TSG RAN WG1 Meeting #48*, Feb. 2007, Missori, USA, pp. 1-8.
"Text Proposal for TS36.211 for 4-Tx Antenna SU-MIMO Codebook," *3GPP TSG RAN WG1 49bis*, Jun. 2007, Orlando, USA, pp. 1-3.
Network MIMO Team, "Block Diagonal Codebook Concept in 3GPP LTE (Rev. 7)," Aug. 2007, slides 0-19.
LTE TI codebook and SAIT IPr.doc :[New] Opinion about the both companies' codebook Tech, pp. 1-2.

* cited by examiner

*Primary Examiner* — Kevin Kim
(74) *Attorney, Agent, or Firm* — NSIP Law

(57) ABSTRACT

A method of generating a codebook for a multiple-input multiple-output (MIMO) system is provided. The codebook generation method includes: assigning a single-polarized preceding matrix to diagonal blocks among a plurality of blocks arranged in a block diagonal format in which a number of diagonal blocks corresponds to a number of polarization directions of transmitting antennas; and assigning a zero matrix to remaining blocks excluding the diagonal blocks.

37 Claims, 5 Drawing Sheets

$$W_{BD,1} = \begin{bmatrix} 1 & 1 & 0 & 0 \\ -1 & 1 & 0 & 0 \\ 0 & 0 & 1 & 1 \\ 0 & 0 & -1 & 1 \end{bmatrix}$$

$$W_{BD,2} = \begin{bmatrix} 1 & 1 & 0 & 0 \\ j & -j & 0 & 0 \\ 0 & 0 & 1 & 1 \\ 0 & 0 & j & -j \end{bmatrix}$$

CODEBOOK GENERATING METHOD AND APPARATUS FOR GENERATING A CODEBOOK FOR MULTI-POLARIZED MULTIPLE-INPUT MULTIPLE-OUTPUT (MIMO) SYSTEMS

CROSS-REFERENCE TO RELATED APPLICATIONS

This application claims the benefit of U.S. Provision Application No. 60/899,634, filed on Feb. 6, 2007 and U.S. Provision Application No. 60/929,032, filed on Jun. 8, 2007 in the U.S. Patent and Trademark office, and Korean Patent Application No. 2007-28878, filed on Mar. 23, 2007 and Korean Patent Application No. 2007-95490, filed on Sep. 19, 2007 in the Korean Intellectual Property Office, the disclosures of which are incorporated herein by reference.

BACKGROUND OF THE INVENTION

1. Field of the Invention

Aspects of the present invention relate to a multiple-input multiple-output (MIMO) system, and more particularly, to a codebook of preceding matrices for use in MIMO systems and a method of generating a codebook for use in such MIMO systems.

2. Description of the Related Art

Currently, wireless communication technologies for providing a variety of multimedia services in wireless communication environments are expanding. High-speed data transmission is needed to provide high quality multimedia services in wireless communication systems. Accordingly, various research has been conducted to support high-speed data transmission in such wireless communication systems. A recent proposal to achieve high-speed data transmission relates to the use of multiple antennas at both the transmitter and the receiver, known as multiple-input multiple-output (MIMO) systems.

MIMO technology offers significant increases in channel capacities with limited frequency resources and in data transmission rates by using multiple antennas at both the transmitter and the receiver. In such MIMO systems, a number of antennas are used when scattering conditions are substantial, and theoretically, MIMO systems provide channel capacities proportional to the number of antennas. Such MIMO technology can serve as an important component of the next generation mobile communication systems, such as $3^{rd}$ Generation Partnership Project (3GPP), Super 3G (or 3G Long Term Evolution "LTE"), 3GPP2 and upcoming 4G systems, particularly, for the downlink from a single base station to multiple user equipments.

However, when MIMO technology is deployed, the physical space and area for installing antennas may be limited. Communication systems using MIMO technology are highly affected by spacing between antennas. Specifically, as the spacing between antennas becomes smaller, higher correlation between wireless channels can be generated. Particularly, when antennas have the same polarization, higher correlation between wireless channels can be generated. Correlation generated between wireless channels reduces reliability for data communication and also reduces data transmission rates.

Accordingly, various methods of using the polarization direction of antennas are needed in order to reduce an area for installing multiple antennas and also to increase channel capacities. When multi-polarized antennas are used in MIMO systems, Correlation between wireless channels can be reduced.

Coding operations, referred to as a precoding, are needed to effectively transmit data, via wireless channels, in MIMO systems to maximize system performance and capacity. Precoding represents multi-layer beamforming in which a transmission signal (data) is emitted from each of the antennas in accordance with a data precoding rule, i.e., appropriate phase (and gain) weighting such that the signal power is maximized at the receiver input and the multipath fading effect is minimized. The weight can be expressed in terms of a preceding matrix (i.e., a set of beam-forming vectors) and is selected from a set of precoding matrices in a codebook.

Currently, there are various types of codebooks designed for the particular cases of single-polarized MIMO schemes where the polarization of antennas is single-polarization. However, no effective codebook has been offered in association with cases of multi-polarized MIMO schemes where the polarization of antennas is multi-polarization. Existing codebooks designed for single-polarized MIMO schemes cannot be optimized for multi-polarized MIMO schemes.

Accordingly, there is a need for a method and apparatus for generating a codebook for a MIMO system with low complexity and excellent performance, even when the polarization of antennas is multi-polarization.

SUMMARY OF THE INVENTION

Aspects of the present invention provide a method and apparatus for generating a codebook for a multi-polarized multiple-input multiple-output (MIMO) system that can generate a precoding matrix using a single-polarized precoding matrix even when the polarization of antennas is multi-polarization, and thereby obtain an excellent preceding matrix that is easily generated.

Additional aspects and/or advantages of the invention will be set forth in part in the description which follows and, in part, will be obvious from the description, or may be learned by practice of the invention.

Aspects of the present invention also provide a method and apparatus for generating a codebook in a multi-polarized MIMO system that can reconstruct a precoding matrix according to a transmission rank.

Aspects of the present invention also provide a method and apparatus for generating a codebook in a multi-polarized MIMO system that can generate a rotated matrix when the polarization direction of transmitting antennas is rotated, which can flexibly cope with a change in the polarization direction.

According to an aspect of the present invention, there is provided a method of generating a codebook for use in a multi-polarized MIMO, the method including: assigning a single-polarized precoding matrix to each of diagonal blocks among a plurality of blocks arranged in a block diagonal structure in which a number of diagonal blocks corresponds to a number of polarization directions of transmitting antennas; and assigning a zero matrix to each of remaining blocks excluding the diagonal blocks within the block diagonal structure.

According to another aspect of the present invention, the codebook generation method may further include: generating a preceding matrix for multi-polarized MIMO by combining the single-polarized preceding matrices assigned to the diagonal blocks and the zero matrices assigned to the remaining blocks within the block diagonal structure.

According to another aspect of the present invention, the codebook generation method may further include: reconstructing the preceding matrix by selecting, from the precoding matrix, at least one column vector according to a transmission rank corresponding to a number of data streams to be transmitted.

According to another aspect of the present invention, the codebook generation method may further include: generating a rotated preceding matrix using the precoding matrix and a rotated matrix corresponding to a rotated angle of the polarization direction when the polarization direction of transmitting antennas is rotated.

According to another aspect of the present invention, the codebook generation method may further include: adjusting a phase of each of elements included in the reordered matrix using a diagonal matrix.

According to another aspect of the present invention, there is provided an apparatus for generating a codebook for multi-polarized MIMO, the apparatus including: a single-polarized preceding matrix assignment unit to assign a single-polarized preceding matrix to each of diagonal blocks among a plurality of blocks arranged in a block diagonal structure in which a number of diagonal blocks corresponds to a number of polarization directions of transmitting antennas; and a zero matrix assignment unit to assign a zero matrix to each of remaining blocks excluding the diagonal blocks within the block diagonal structure.

In addition to the example embodiments and aspects as described above, further aspects and embodiments will be apparent by reference to the drawings and by study of the following descriptions.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

DETAILED DESCRIPTION OF THE EXAMPLE EMBODIMENTS

Figure 1A:
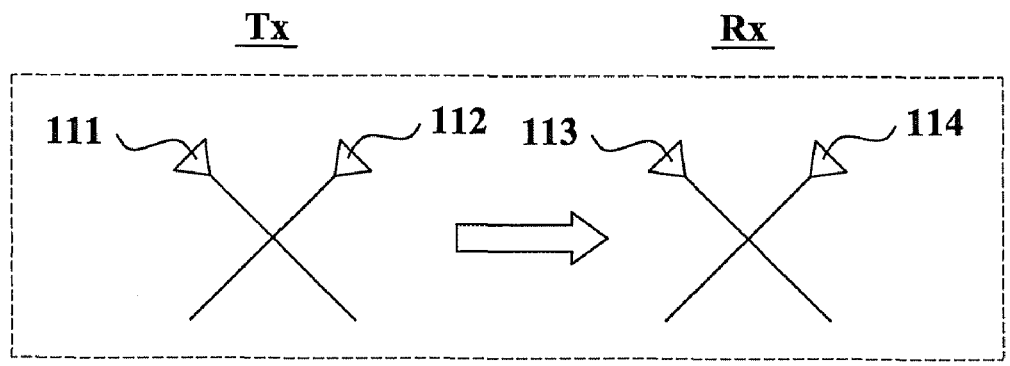
FIGS. 1A-1C illustrate multi-polarized transmitting/receiving antennas in a MIMO system according to example embodiments of the present invention.

Reference will now be made in detail to present embodiments of the present invention, examples of which are illustrated in the accompanying drawings, wherein like reference numerals refer to the like elements throughout. The embodiments are described below in order to explain the present invention by referring to the figures.

Prior to describing embodiments of the present invention in detail, examples of current codebooks designed for single-polarized MIMO including a discrete Fourier transform (DFT) codebook and a rotated DFT codebook are provided herein below to help understanding the construction of the new codebook for the particular case of multi-polarized MIMO. For example, a DFT codebook providing a DFT precoding matrix for use in a single-polarized MIMO system may be represented as follows:

$$\gamma = \{U^{(0)}, U^{(1)}, \ldots, U^{(2^B-1)}\}: \text{Precoding matrix set}$$
$$U^{(b)} = [u_0^{(b)} \ldots u_{M-1}^{(b)}]: \text{bth precoding matrix}$$
$$u_{m-1}^{(b)}: \text{mth column vector in the matrix } U^{(b)}, \quad \text{[Equation 1]}$$

where B is the number of bits necessary to indicate one of those $2^{(B)}$ DFT preceding matrices, M is a number of transmitting antennas, $\gamma$ is a DFT codebook that is a set of DFT preceding matrices, and $U^{(b)}$ is the $b^{th}$ DFT preceding matrix. The $m^{th}$ column vector in the matrix $U^{(b)}$ may be represented as $u_{m-1}^{(b)}$. Specifically, the DFT codebook includes $2^{(B)}$ DFT precoding matrices. Each of the $2^{(B)}$ DFT preceding matrices includes M column vectors.

Also, each of the DFT precoding matrices is an M×M matrix, and $u_{m-1}^{(b)}$ is a vector having m elements and may be a column vector having a size of M×1.

In the DFT codebook, $u_m^{(b)}$ may be defined as follows:

$$u_m^{(b)} = \frac{1}{\sqrt{M}} \begin{bmatrix} u_{0m}^{(b)} & \cdots & u_{(M-1)m}^{(b)} \end{bmatrix}^T \quad \text{[Equation 2]}$$

$$u_{nm}^{(b)} = \exp\left\{j\frac{2\pi n}{M}\left(m + \frac{b}{2^B}\right)\right\}.$$

That is, $2^{(B)}$ DFT preceding matrices exist in the DFT codebook. Each DFT precoding matrix is an M×M matrix. Also, each of the M×M DFT precoding matrices includes M column vectors. Each column vector may be an M×1 column vector, and elements of the column vector may be determined as in the above Equation 2.

For example, when the polarization of two (2) transmitting antennas are single-polarization, the DFT preceding matrix may include two matrices given as follows, $$\begin{bmatrix} 1 & 1 \\ j & -j \end{bmatrix}, \begin{bmatrix} 1 & 1 \\ 1 & -1 \end{bmatrix} \quad \text{[Equation 3]}$$

In contrast to the current DFT codebook for single-polarized MIMO system, a rotated DFT codebook is a set of rotated DFT preceding matrices for use in a single-polarized MIMO system. Such a rotated DFT codebook may be represented as follows:

$$\{E, E^2, \ldots E^{2^B}\}: \text{such that } U^{(i)} \underline{A} E^{i+1} \quad \text{[Equation 4]}$$

An $i^{th}$ rotated DFT preceding matrix may be represented as follows:

$$E^{(i)} = \begin{bmatrix} e^{j\theta_0} & 0 & \cdots & 0 \\ 0 & e^{j\theta_1} & \cdots & 0 \\ \vdots & \vdots & \ddots & \vdots \\ 0 & 0 & \cdots & e^{j\theta_{M-1}} \end{bmatrix} DFT_M, \quad \text{[Equation 5]}$$

where $DFT_M$ is a DFT precoding matrix in the single-polarized MIMO system. The rotated DFT precoding matrix $DFT_M$ is generated by rotating all the elements, included in each of rows of the DFT preceding matrix, by a particular phase.

Also, in a MIMO system, a transmitting antenna located at a transmitter side transmits a data signal, via a wireless channel, to a receiving antenna located at a receiver side. The wireless channel may be referred to as a channel matrix H. In a multi-polarized MIMO system, the channel matrix H may be modeled as H=X⊙H'. Here, the symbol "⊙" denotes a Hadamard product of matrices and has a calculation rule, as given by:

$$\begin{bmatrix} a & b \\ c & d \end{bmatrix} \odot \begin{bmatrix} x & y \\ z & w \end{bmatrix} = \begin{bmatrix} ax & by \\ cz & dw \end{bmatrix}. \quad \text{[Equation 6]}$$

Hereinafter, the present invention will be described in detail with reference to the accompanying drawings.

Figure 1B:
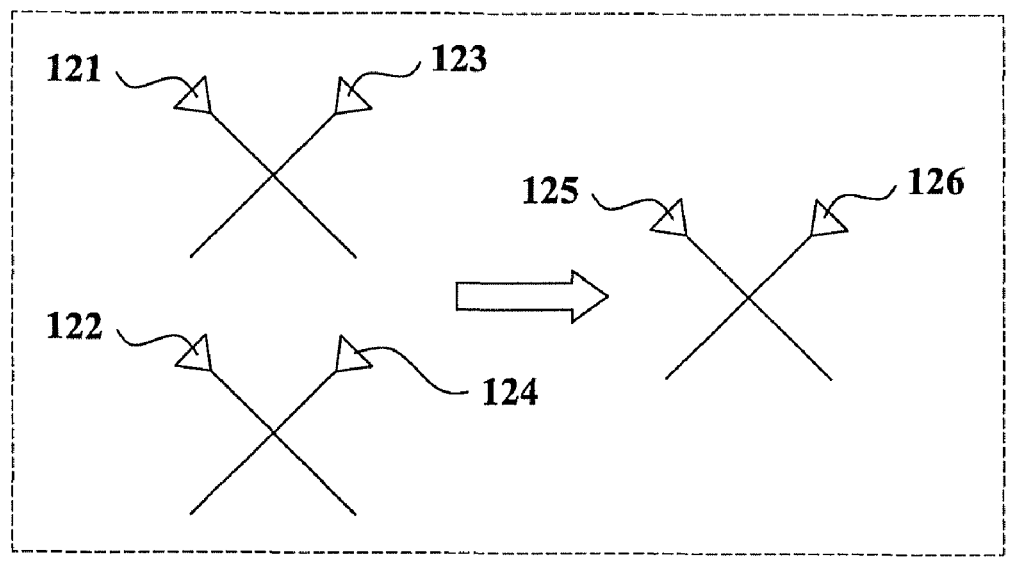
Figure 1C:
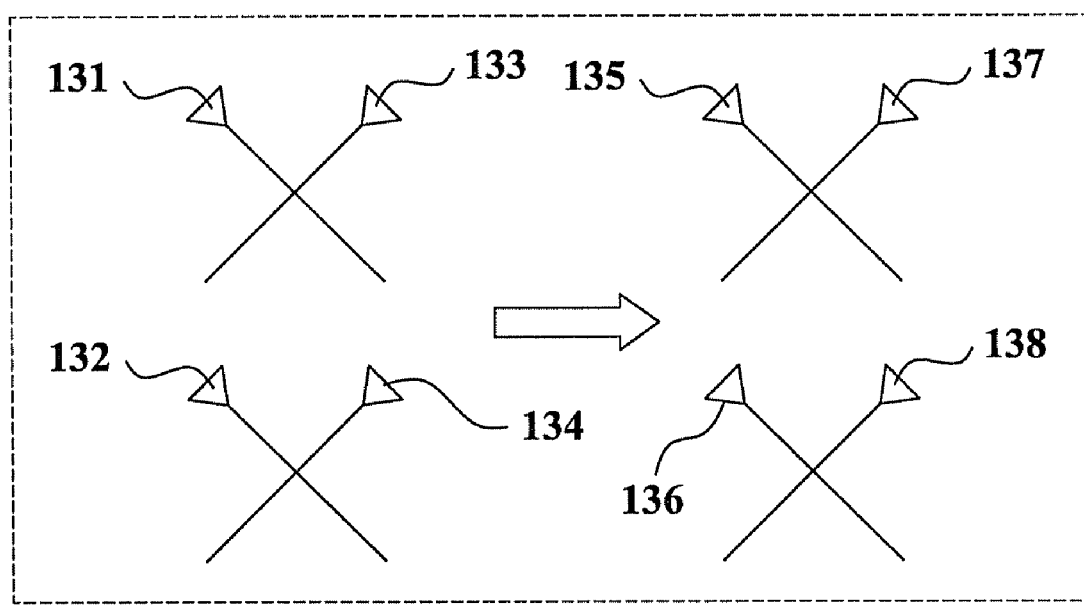

Turning now to FIGS. 1A-1C, various combinations of dual-polarized transmitting/receiving antennas for multi-polarized MIMO channels according to example embodiments of the present invention are illustrated.

Referring to FIG. 1A, a MIMO system 110 includes two transmitting antennas (2Tx) 111 and 112 arranged at a transmitter side, and two receiving antennas (2Rx) 113 and 114 arranged at a receiver side. The two transmitting antennas 111 and 112 are perpendicular to each other. Accordingly, the polarization directions of signals transmitted, via a wireless channel (i.e., channel matrix H), by the transmitting antennas 111 and 112 are orthogonal to each other.

For 2Tx-2Rx: Precoding matrix X may be represented as follows:

$$X = \begin{bmatrix} 1 & \sqrt{\chi} \\ \sqrt{\chi} & 1 \end{bmatrix}$$

The parameter $\chi$, called depolarization factor, can be thought of as a global XPD (cross polarization discrimination) of the antennas and the channel. The exact value of the depolarization factor can be difficult to quantify as it depends upon many factors and will vary from one wireless environment to another. Such a depolarization factor can cover the wide range of values of values $0 \leq \chi \leq 1$.

Similarly, another MIMO system 120, as shown in FIG. 1B, includes four transmitting antennas (4Tx) 121, 122, 123, and 124 arranged at a transmitter side, and two receiving antennas (2Rx) 125 and 126 arranged at a receiver side. The polarized directions of signals transmitted, via a wireless channel (i.e., channel matrix H), by two transmitting antennas 121 and 122 and remaining two transmitting antennas 123 and 124 are orthogonal to each other.

For 4Tx-2Rx: Precoding matrix X may be represented as follows:

$$X = \begin{bmatrix} 1 & 1 & \sqrt{\chi} & \sqrt{\chi} \\ \sqrt{\chi} & \sqrt{\chi} & 1 & 1 \end{bmatrix}$$

Also, still another MIMO system 130, as shown in FIG. 1C, includes four transmitting antennas (4Tx) 131, 132, 133, and 134 arranged at a transmitter side, and four receiving antennas (4Rx) 135, 136, 137, and 138 arranged at a receiver side.

For 4Tx-4Rx: Precoding matrix X may be represented as follows:

$$X = \begin{bmatrix} 1 & 1 & \sqrt{\chi} & \sqrt{\chi} \\ 1 & 1 & \sqrt{\chi} & \sqrt{\chi} \\ \sqrt{\chi} & \sqrt{\chi} & 1 & 1 \\ \sqrt{\chi} & \sqrt{\chi} & 1 & 1 \end{bmatrix}, \quad \text{[Equation 7]}$$

where $\chi$ is a real number, and $0 \leq \chi \leq 1$.

Referring to Equation 7, the first column and the second column of the matrix X correspond to two transmitting antennas (2Tx) 121 and 122, and the third column and the fourth column of the matrix X correspond to other two transmitting antennas (2Tx) 123 and 124.

Specifically, the channel matrix H may be modeled as: H=X⊙H'. Also, when four transmitting antennas (4Tx) and four receiving antennas (4Rx) are arranged in the MIMO system 130, shown in FIG. 1C, the precoding matrix X may be a 4×4 matrix, as shown in Equation 7. Also, the four transmitting antennas (4Tx) 131, 132, 133, and 134 transmit signals in two polarization directions. As a result, the matrix X may be modeled as a preceding matrix having the two blocks in a diagonal direction.

When a distance between transmitting antennas (Tx) and receiving antennas (Rx) is small, that is, for example, when the user equipment (UE) is close to the base station (BS), parameter $\chi$, called depolarization factor, may be modeled close to zero "0". Conversely, when a distance between transmitting antennas (Tx) and receiving antennas (Rx) is great, that is, for example, when there are large cells within the wireless networks, $\chi$ may be modeled close to one "1". Accordingly, when $\chi$ changes from "0" to "1", that is, within the range of $0 \leq \chi \leq 1$, the codebook should have excellent performance in both a single-polarized MIMO system and a multi-polarized MIMO system.

Figure 2:
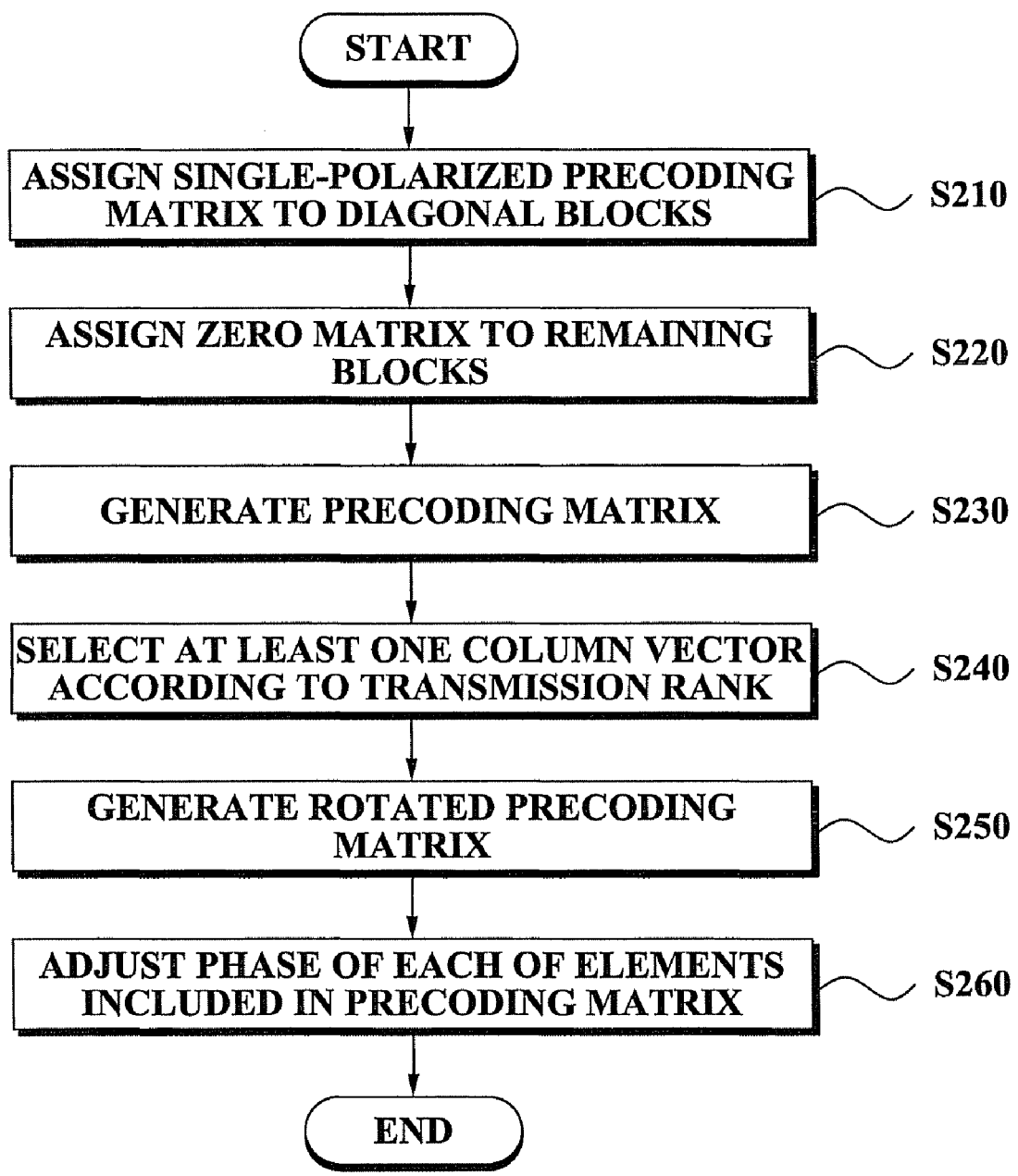
FIG. 2 is a flowchart illustrating a method of generating a codebook of precoding matrices for use in a multi-polarized MIMO system according to an example embodiment of the present invention.

FIG. 2 is a flowchart illustrating a method of generating a codebook for use in a multi-polarized MIMO system according to an example embodiment of the present invention. Such a codebook is provided with a set of unitary matrices designed not only for multi-polarized MIMO schemes, but also single-polarized MIMO schemes without any significant performance degradation. The codebook for such multi-polarized MIMO can be constructed in a block diagonal structure, known as a block diagonal multi-polarized codebook. Similarly, a preceding matrix for use in a multi-polarized MIMO in such a block diagonal structure can be expressed in terms of M×N, where M indicates a number of transmitting antennas at a transmitter side and N indicates a number of data streams in the matrix X. The size of such a matrix may be determined according to a transmission rank (spatial multiplexing rate) corresponding to at least one of the number of transmitting antennas and the number of data streams to be transmitted, via the wireless channels. For example, if the number of transmitting antennas (Tx) is four (4) and the transmission rank, that is, the number of data streams is also four (4), then the size of the matrix may be 4×4.

Such a matrix (block diagonal multi-polarized codebook) may be organized or modeled as having a plurality of blocks according to a number of polarization directions of transmitting antennas within a block diagonal structure. Blocks in a diagonal direction are known as diagonal blocks. In an M×N matrix, the term "diagonal direction" refers to a direction from an element of a first column and a first row to an element in an $M^{th}$ column and $N^{th}$ row. For example, when a 4×4 matrix is divided into four sets of 2×2 matrices, a 2×2 matrix that includes elements, included in either the first (1st) or second ($2^{nd}$) column and also included in either the first (1st) or second ($2^{nd}$) row of the matrix, and another 2×2 matrix that includes elements, included in either the third (3rd) or fourth ($4^{th}$) column and also included in either the third (3rd) or fourth ($4^{th}$) row of the matrix, are characterized as "diagonal blocks."

In this instance, when the number of polarization directions of transmitting antennas is two (2), the total number of diagonal blocks may be two (2) and the total number of remaining blocks within the block diagonal structure may be two (2). Similarly, when the number of polarization directions of transmitting antennas is three (3), the total number of diagonal blocks may be three (3) and the total number of remaining blocks may be six (6).

Referring to FIG. 2, in operation S210, a single-polarized precoding matrix is assigned to each of diagonal blocks among a plurality of blocks within the diagonal block structure. Such a single-polarized precoding matrix is a preceding matrix designed for single-polarized MIMO.

For example, the single-polarized preceding matrix assigned to the diagonal blocks in such a block diagonal multi-polarized codebook may include a DFT preceding matrix or a rotated DFT preceding matrix selected in a matrix codebook designed for single-polarized MIMO, e.g., the DFT codebook or the rotated DFT codebook or any other matrix codebook. Any one of the DFT preceding matrix and the rotated DFT preceding matrix may be assigned to diagonal blocks.

In addition, the size of the single-polarized preceding matrix may be determined according to the number of transmitting antennas (Tx) having the same polarization direction. For example, it is assumed that the total number of transmitting antennas (Tx) is eight (8), and the polarization direction by two transmitting antennas (2Tx) is a direction x and the polarization direction by the remaining six transmitting antennas (6Tx) is a direction y. In this case, the direction x is perpendicular to the direction y. Also, the number of polarization directions is two (2), that is, the directions x and y. Accordingly, the precoding matrix for multi-polarized MIMO may have two diagonal blocks.

Also, the number of rows of the single-polarized preceding matrix that are assigned to one diagonal block may be six (6) and the number of rows of the single-polarized preceding matrix that are assigned to the remaining one diagonal block may be two (2). In this case, if the transmission rank is eight (8), more specifically, if the transmission rank of two antennas having the direction x as the polarization direction is two (2) and the transmission rank of six antennas having the direction y as the polarization direction is six (6), a 2×2 single-polarized preceding matrix may be assigned to any one of two diagonal blocks and a 6×6 single-polarized preceding matrix may be assigned to the other one of the two diagonal blocks.

In operation S220, a zero matrix is assigned to each of the remaining blocks, excluding the diagonal blocks, within the block diagonal structure.

Specifically, the zero matrix of which all the elements are '0' is assigned to blocks that are not the diagonal blocks among the blocks that are obtained within the block diagonal structure according to the number of polarization directions of transmitting antennas.

In operation S230, a precoding matrix for multi-polarized MIMO, i.e., a block diagonal multi-polarized codebook is then generated by combining the single-polarized preceding matrices assigned to the diagonal blocks and the zero matrices assigned to the remaining blocks within the block diagonal structure.

For example, if four transmitting antennas (4Tx) exist, and two transmitting antennas (2Tx) thereof have the direction x as the polarization direction and the remaining two transmitting antennas (2Tx) have the direction y as the polarization direction, the codebook for the multi-polarized MIMO system may include a 4×4 matrix as provided, for example, by:

$$\begin{bmatrix} 1 & 1 & 0 & 0 \\ j & -j & 0 & 0 \\ 0 & 0 & 1 & 1 \\ 0 & 0 & j & -j \end{bmatrix}, \begin{bmatrix} 1 & 1 & 0 & 0 \\ 1 & -1 & 0 & 0 \\ 0 & 0 & 1 & 1 \\ 0 & 0 & 1 & -1 \end{bmatrix} \quad [\text{Equation 8}]$$

The two multi-polarized precoding matrices of Equation 8 are only an example of the present invention. Multi-polarized preceding matrices may be generated by randomly combining the two DFT preceding matrices of Equation 3, for example, assigned to the diagonal blocks with the two zero matrices assigned to the remaining blocks within the block diagonal structure.

Specifically, the preceding matrix for the multi-polarized MIMO system may be generated by organizing the precoding matrix into the plurality of blocks according to the number of polarization directions of transmitting antennas, and assigning the single-polarized preceding matrix to the diagonal blocks among all blocks. The zero matrix is then assigned to each of the remaining blocks within the block diagonal structure.

For example, when it is assumed that four transmitting antennas exist and the number of polarization directions of transmitting antennas is two (2), the size of the preceding matrix for multi-polarized MIMO may be 4×4. Also, since the number of polarization directions of transmitting antennas is two (2), the precoding matrix may be organized into a total of four (4) blocks according to the number of polarization directions. The preceding matrix for multi-polarized MIMO (block diagonal multi-polarized codebook) is then generated by assigning the single-polarized preceding matrix to each of the two (2) diagonal blocks and assigning the zero matrix to each of the two (2) remaining blocks that are not the two (2) diagonal blocks within the block diagonal structure.

In operation S240, the preceding matrix (block diagonal multi-polarized codebook) is then reconstructed by selecting, from the same preceding matrix, at least one column vector according to a transmission rank corresponding to a number of data streams to be transmitted, via the wireless channel.

For example, it may be assumed that if four transmitting antennas have a multi polarization, a 4×4 precoding matrix is generated. The 4×4 precoding matrix is given by:

$$\begin{bmatrix} 1 & 1 & 0 & 0 \\ 1 & -1 & 0 & 0 \\ 0 & 0 & 1 & 1 \\ 0 & 0 & 1 & -1 \end{bmatrix}. \qquad [\text{Equation 9}]$$

Referring to Equation 9, when the transmission rank is two (2), the precoding matrix (block diagonal multi-polarized codebook) may be reconstructed by selecting two column vectors from four column vectors included in the precoding matrix. Specifically, the preceding matrix of Equation 9 may be reconstructed to generate six preceding matrices having a size of 4×2, as given by:

$$\begin{bmatrix} 1 & 1 \\ 1 & -1 \\ 0 & 0 \\ 0 & 0 \end{bmatrix}, \qquad [\text{Equation 10}]$$

$$\begin{bmatrix} 0 & 0 \\ 0 & 0 \\ 1 & 1 \\ 1 & -1 \end{bmatrix},$$

$$\begin{bmatrix} 1 & 0 \\ 1 & 0 \\ 0 & 1 \\ 0 & 1 \end{bmatrix},$$

$$\begin{bmatrix} 1 & 0 \\ 1 & 0 \\ 0 & 1 \\ 0 & -1 \end{bmatrix},$$

$$\begin{bmatrix} 1 & 0 \\ -1 & 0 \\ 0 & 1 \\ 0 & 1 \end{bmatrix},$$

$$\begin{bmatrix} 1 & 0 \\ -1 & 0 \\ 0 & 1 \\ 0 & -1 \end{bmatrix}.$$

When the number of transmitting antennas is M and the transmission rank is r, an M×M preceding matrix may be generated. Also, an M×r preceding matrix may be generated by selecting column vectors according to the transmission rank and reconstructing the precoding matrix.

Specifically, according to the present invention, unnecessary column vectors may be removed from the preceding matrix by reconstructing the preceding matrix according to the transmission rank, and thus a codebook may be efficiently generated.

In operation S250, when the polarization direction of transmitting antennas is rotated, a rotated preceding matrix is generated using the preceding matrix and a rotated matrix. The rotated matrix may correspond to a rotated angle of polarization direction of transmitting antennas (Tx).

The array structure of transmitting antennas may be variously embodied. For example, in the multi-polarized MIMO system, transmitting antennas corresponding to one polarization direction may be installed vertically with respect to a reference plane and transmitting antennas corresponding to another polarization direction may be installed horizontally with respect to the reference plane. Also, the transmitting antennas corresponding to one polarization direction may be installed in a direction of +45 degrees with respect to the reference plane and transmitting antennas corresponding to the other polarization direction may be installed in a direction of −45 degrees with respect to the reference plane.

Specifically, when the polarization direction of transmitting antennas is rotated by a particular angle with respect to the reference plane, a data stream must be beam formed using the rotated preceding matrix. The rotated precoding matrix may be generated by rotating the preceding matrix. Specifically, the rotated preceding matrix may be generated by multiplying the preceding matrix and the rotated matrix.

For example, when it is assumed that respective two transmitting antennas among four transmitting antennas are installed in a direction of +45 degrees and in a direction of −45 degrees with respect to the reference plane, the rotated matrix may be represented as follows:

$$U_{rot} = \begin{bmatrix} 1 & 0 & -1 & 0 \\ 0 & 1 & 0 & -1 \\ 1 & 0 & 1 & 0 \\ 0 & 1 & 0 & 1 \end{bmatrix}. \qquad [\text{Equation 11}]$$

The rotated matrix $U_{rot}$ may be multiplied by a random complex value. The resulting structure when multiplying the rotated matrix $U_{rot}$ by the random scalar value falls within the scope of the present invention.

When the precoding matrix is referred to as $W_{BD}$, the rotated precoding matrix $W_{RBD}$ that is generated by rotating the preceding matrix $W_{BD}$ may be represented as follows:

$$W_{RBD} = \frac{1}{2} U_{rot} W_{BD} \qquad [\text{Equation 12}]$$

Referring to Equation 12, the rotated matrix $U_{rot}$ may be determined to correspond to the rotated angle of polarization direction of transmitting antennas.

According to the present invention, even when various types of arrays are provided, such as transmitting antennas with a rotated polarization direction, the rotated precoding matrix may be readily generated using the rotated matrix.

In operation S250, a reordered matrix is obtained by reordering column vectors that are included in the precoding matrix, and the reordered matrix and the rotated matrix are used to generate a rotated precoding matrix.

For example, it is assumed that when two respective transmitting antennas among four transmitting antennas are installed in a direction of +45 degrees and in a direction of −45 degrees with respect to the reference plane, the preceding matrix $W_{BD}$ is generated. In this instance, the rotated matrix $U_{rot}$ is the same as Equation 11. The preceding matrix $W_{BD}$ is represented as follows:

$$W_{BD} = \begin{bmatrix} 1 & 1 & 0 & 0 \\ -1 & 1 & 0 & 0 \\ 0 & 0 & 1 & 1 \\ 0 & 0 & -1 & 1 \end{bmatrix}. \quad \text{[Equation 13]}$$

When column vectors included in the preceding matrix $W_{BD}$ of Equation 13 are reordered, the reordered matrix $W_{reorder,BD}$ may be represented as follows:

$$W_{reorder,BD} = \begin{bmatrix} 1 & 0 & 1 & 0 \\ -1 & 0 & 1 & 0 \\ 0 & 1 & 0 & 1 \\ 0 & -1 & 0 & 1 \end{bmatrix}. \quad \text{[Equation 14]}$$

By using the reordered matrix $W_{reorder,BD}$ and the rotated matrix $U_{rot}$ of Equation 11, the rotated precoding matrix $W_{RBD}$ may be generated and a data stream may be beam formed using the rotated preceding matrix $W_{RBD}$, represented as follows:

$$W_{RBD} = \frac{1}{2} U_{rot} W_{BD} \quad \text{[Equation 15]}$$

$$= \frac{1}{2} \begin{bmatrix} 1 & 0 & -1 & 0 \\ 0 & 1 & 0 & -1 \\ 1 & 0 & 1 & 0 \\ 0 & 1 & 0 & 1 \end{bmatrix} \begin{bmatrix} 1 & 0 & 1 & 0 \\ -1 & 0 & 1 & 0 \\ 0 & 1 & 0 & 1 \\ 0 & -1 & 0 & 1 \end{bmatrix}$$

$$= \frac{1}{2} \begin{bmatrix} 1 & -1 & 1 & -1 \\ -1 & 1 & 1 & -1 \\ 1 & 1 & 1 & 1 \\ -1 & -1 & 1 & 1 \end{bmatrix}$$

Referring to Equation 15, it may be seen that when two respective transmitting antennas among four transmitting antennas are installed in a direction of +45 degrees and in a direction of −45 degrees with respect to the reference plane, the rotated preceding matrix $W_{RBD}$ corresponding to the preceding matrix $W_{BD}$ of Equation 13 may be generated like Equation 15.

In operation S260, a phase of each of elements included in the reordered matrix is adjusted. The phase of each of elements included in the reordered matrix may be adjusted using a diagonal matrix. In this instance, the diagonal matrix includes diagonal elements. Also, the phase of each of the diagonal elements may be the same or different from each other. The amplitude of each diagonal element is set to '1'. The amplitude of each of remaining elements, excluding the diagonal elements, is set to '0'.

The diagonal matrix is associated with a modulation scheme of data symbols, instead of increasing channel capacities of the MIMO system, and the like. For example, when the data symbol is modulated using quadrature phase shift keying (QPSK), the diagonal matrix may change only the phase of the data symbol, but may not affect channel capacities of the MIMO system.

In this instance, it is assumed that the preceding matrix $W_{BD}$ and the reordered matrix $W_{reorder,BD}$ are given by:

$$W_{BD} = \begin{bmatrix} 1 & 1 & 0 & 0 \\ j & -j & 0 & 0 \\ 0 & 0 & 1 & 1 \\ 0 & 0 & j & -j \end{bmatrix}, \quad \text{[Equation 16]}$$

$$W_{reorder,BD} = \begin{bmatrix} 1 & 0 & 1 & 0 \\ j & 0 & -j & 0 \\ 0 & 1 & 0 & 1 \\ 0 & j & 0 & -j \end{bmatrix}.$$

In this instance, the phase of each element included in the reordered matrix $W_{reorder,BD}$ may be adjusted like Equation 17 below, and data symbols may be beam formed by using $W'_{reorder,BD}$. Equation 17 is given by:

$$W'_{reorder,BD} = W_{reorder,BD} \begin{bmatrix} 1 & 0 & 0 & 0 \\ 0 & j & 0 & 0 \\ 0 & 0 & 1 & 0 \\ 0 & 0 & 0 & j \end{bmatrix} \quad \text{[Equation 17]}$$

$$= \begin{bmatrix} 1 & 0 & 1 & 0 \\ j & 0 & -j & 0 \\ 0 & j & 0 & j \\ 0 & -1 & 0 & 1 \end{bmatrix}$$

Aspects of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

Figures 3, 4:
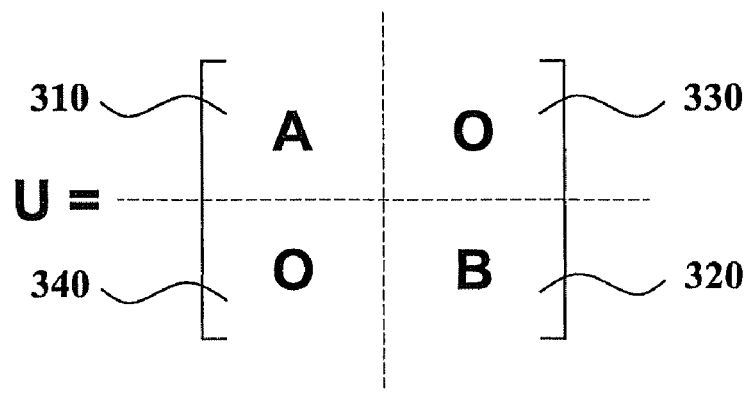
FIG. 3 illustrates a preceding matrix for use in a multi-polarized MIMO system according to an example embodiment of the present invention.
FIG. 4 illustrates precoding matrices where a discrete Fourier transform (DFT) preceding matrix is assigned to diagonal blocks in a multi-polarized MIMO system according to an example embodiment of the present invention.

FIG. 3 illustrates a precoding matrix for use in a multi-polarized MIMO system according to an example embodiment of the present invention.

Referring to FIG. 3, when the number of transmitting antennas is four (4) and the number of polarization directions of transmitting antennas is two (2), U indicates a preceding matrix for the multi-polarized MIMO system. Matrices such as an 'A' matrix 310 and a 'B' matrix 320, as shown in FIG. 3, indicate a single-polarized preceding matrix, that is, a preceding matrix selected from a matrix codebook designed for single-polarized MIMO, e.g., DFT codebook or rotated DFT codebook or any other matrix codebook, and two 'O' matrices 330 and 340 indicate zero matrices.

Since the number of polarization directions of transmitting antennas is two (2), two diagonal blocks and two remaining blocks exist. The 'A' matrix 310 and the 'B' matrix 320, that is, single-polarized precoding matrices, are assigned to the diagonal blocks respectively. The 'O' matrices 330 and 340, that is, zero matrices, are assigned to the remaining blocks respectively.

The size of the 'A' matrix 310 and the 'B' matrix 320 may be determined according to the number of transmitting antennas having the same polarization direction.

For example, when the polarization directions of transmitting antennas are a direction x and a direction y, the number of polarization directions of transmitting antennas may be two (2). Also, it may be assumed that when a total number of transmitting antennas is four (4), the polarization direction of two transmitting antennas is the direction x and the polarization direction of the remaining two transmitting antennas is the direction y. In this instance, the 'A' matrix 310 may be a single-polarized preceding matrix corresponding to the polarization direction of the direction x. Since the number of transmitting antennas having a polarization direction in the direction x is two (2), the number of rows of the 'A' matrix 310 may be two (2). Also, the number of rows of the 'B' matrix 320 may be two (2).

When the transmission rank for the direction x is two (2), the number of rows of the 'A' matrix 310 may be two (2). Also, when the transmission rank for the direction y is two (2), the number of rows of the 'B' matrix 320 may be two (2).

FIG. 4 illustrates single-polarized preceding matrices, such as, DFT precoding matrices assigned to diagonal blocks in a multi-polarized MIMO system according to an example embodiment of the present invention.

Referring to FIG. 4, $W_{BD,1}$ and $W_{BD,2}$ are precoding matrices when the number of transmitting antennas is four (4), the number of polarization directions of transmitting antennas is two (2), and the number of transmitting antennas having the same polarization direction is two (2).

The DFT preceding matrices that are assigned to diagonal blocks of the preceding matrices $W_{BD,1}$ and $W_{BD,2}$ can be represented as follows:

$$\begin{bmatrix} 1 & 1 \\ 1 & -1 \end{bmatrix}, \begin{bmatrix} 1 & 1 \\ j & -j \end{bmatrix}. \quad \text{[Equation 18]}$$

An example of reordered matrices $W_{reorder,BD,1}$, $W_{reorder,BD,2}$, $W_{reorder,BD,3}$, $W_{reorder,BD,4}$, $W_{reorder,BD,5}$, $W_{reorder,BD,6}$, $W_{reorder,BD,7}$ and $W_{reorder,BD,8}$ that are generated by reordering column vectors included in the precoding matrices $W_{BD,1}$ and $W_{BD,2}$ may be represented as follows:

$$W_{reorder,BD,1} = \begin{bmatrix} 1 & 0 & 1 & 0 \\ 1 & 0 & -1 & 0 \\ 0 & 1 & 0 & 1 \\ 0 & 1 & 0 & -1 \end{bmatrix}, \quad \text{[Equation 19]}$$

$$W_{reorder,BD,2} = \begin{bmatrix} 0 & 1 & 0 & 1 \\ 0 & 1 & 0 & -1 \\ 1 & 0 & 1 & 0 \\ 1 & 0 & -1 & 0 \end{bmatrix},$$

$$W_{reorder,BD,3} = \begin{bmatrix} 1 & 0 & 1 & 0 \\ j & 0 & -j & 0 \\ 0 & 1 & 0 & 1 \\ 0 & j & 0 & -j \end{bmatrix},$$

$$W_{reorder,BD,4} = \begin{bmatrix} 0 & 1 & 0 & 1 \\ 0 & -j & 0 & j \\ 1 & 0 & 1 & 0 \\ -j & 0 & j & 0 \end{bmatrix},$$

$$W_{reorder,BD,5} = \begin{bmatrix} 0 & 1 & 0 & 1 \\ 0 & j & 0 & -j \\ 1 & 0 & 1 & 0 \\ j & 0 & -j & 0 \end{bmatrix},$$

$$W_{reorder,BD,6} = \begin{bmatrix} 1 & 0 & 1 & 0 \\ -1 & 0 & 1 & 0 \\ 0 & 1 & 0 & 1 \\ 0 & -1 & 0 & 1 \end{bmatrix},$$

$$W_{reorder,BD,7} = \begin{bmatrix} 0 & 1 & 0 & 1 \\ 0 & -1 & 0 & 1 \\ 1 & 0 & 1 & 0 \\ -1 & 0 & 1 & 0 \end{bmatrix},$$

$$W_{reorder,BD,8} = \begin{bmatrix} 1 & 0 & 1 & 0 \\ -j & 0 & j & 0 \\ 0 & 1 & 0 & 1 \\ 0 & -j & 0 & j \end{bmatrix}.$$

The reordered matrices may be multiplied by a diagonal matrix. In this instance, diagonal elements of the diagonal matrix are complex numbers that have the size of 1, and remaining elements are 0. The diagonal matrix does not affect channel capacities or beam forming performance, and is associated with a modulation scheme of data symbols.

For example, the phase of each element included in the reordered matrices using random diagonal matrices may be adjusted as shown in Equation 20. In this instance, diagonal elements of a diagonal matrix $D_i$ may be random complex numbers that have the magnitude 1.

$$W_{C,1} = W_{reorder,BD,1} D_1 \quad \text{[Equation 20]}$$
$$= \begin{bmatrix} 1 & 0 & 1 & 0 \\ 1 & 0 & -1 & 0 \\ 0 & 1 & 0 & 1 \\ 0 & 1 & 0 & -1 \end{bmatrix} \begin{bmatrix} 1 & 0 & 0 & 0 \\ 0 & -1 & 0 & 0 \\ 0 & 0 & 1 & 0 \\ 0 & 0 & 0 & -1 \end{bmatrix},$$

$$W_{C,2} = W_{reorder,BD,2} D_2$$
$$= \begin{bmatrix} 0 & 1 & 0 & 1 \\ 0 & 1 & 0 & -1 \\ 1 & 0 & 1 & 0 \\ 1 & 0 & -1 & 0 \end{bmatrix} \begin{bmatrix} -1 & 0 & 0 & 0 \\ 0 & 1 & 0 & 0 \\ 0 & 0 & 1 & 0 \\ 0 & 0 & 0 & -1 \end{bmatrix},$$

$$W_{C,3} = W_{reorder,BD,3} D_3$$
$$= \begin{bmatrix} 1 & 0 & 1 & 0 \\ j & 0 & -j & 0 \\ 0 & 1 & 0 & 1 \\ 0 & j & 0 & -j \end{bmatrix} \begin{bmatrix} 1 & 0 & 0 & 0 \\ 0 & j & 0 & 0 \\ 0 & 0 & 1 & 0 \\ 0 & 0 & 0 & j \end{bmatrix},$$

-continued $$W_{C,4} = W_{reorder,BD,4} D_4$$
$$= \begin{bmatrix} 0 & 1 & 0 & 1 \\ 0 & -j & 0 & j \\ 1 & 0 & 1 & 0 \\ -j & 0 & j & 0 \end{bmatrix} \begin{bmatrix} -1 & 0 & 0 & 0 \\ 0 & j & 0 & 0 \\ 0 & 0 & 1 & 0 \\ 0 & 0 & 0 & -j \end{bmatrix},$$

$$W_{C,5} = W_{reorder,BD,5} D_5$$
$$= \begin{bmatrix} 0 & 1 & 0 & 1 \\ 0 & j & 0 & -j \\ 1 & 0 & 1 & 0 \\ j & 0 & -j & 0 \end{bmatrix} \begin{bmatrix} -1 & 0 & 0 & 0 \\ 0 & -j & 0 & 0 \\ 0 & 0 & 1 & 0 \\ 0 & 0 & 0 & j \end{bmatrix},$$

$$W_{C,6} = W_{reorder,BD,6} D_6$$
$$= \begin{bmatrix} 1 & 0 & 1 & 0 \\ -1 & 0 & 1 & 0 \\ 0 & 1 & 0 & 1 \\ 0 & -1 & 0 & 1 \end{bmatrix} \begin{bmatrix} 1 & 0 & 0 & 0 \\ 0 & 1 & 0 & 0 \\ 0 & 0 & 1 & 0 \\ 0 & 0 & 0 & 1 \end{bmatrix},$$

$$W_{C,7} = W_{reorder,BD,7} D_7$$
$$= \begin{bmatrix} 0 & 1 & 0 & 1 \\ 0 & -1 & 0 & 1 \\ 1 & 0 & 1 & 0 \\ -1 & 0 & 1 & 0 \end{bmatrix} \begin{bmatrix} -1 & 0 & 0 & 0 \\ 0 & -1 & 0 & 0 \\ 0 & 0 & 1 & 0 \\ 0 & 0 & 0 & 1 \end{bmatrix},$$

$$W_{C,8} = W_{reorder,BD,8} D_8$$
$$= \begin{bmatrix} 1 & 0 & 1 & 0 \\ -j & 0 & j & 0 \\ 0 & 1 & 0 & 1 \\ 0 & -j & 0 & j \end{bmatrix} \begin{bmatrix} 1 & 0 & 0 & 0 \\ 0 & -j & 0 & 0 \\ 0 & 0 & 1 & 0 \\ 0 & 0 & 0 & -j \end{bmatrix},$$

Also, a rotated precoding matrix $W_{RBD,i}$ may be generated from $W_{C,i}$ that is generated using the reordered matrix $W_{reorder,BD,i}$ and the diagonal matrix $D_i$. More specifically, the rotated precoding matrix $W_{RBD,i}$ may be generated through a mathematical transformation of the preceding matrices $W_{BD,1}$ and $W_{BD,2}$.

In this instance, when a reordered matrix is generated from the precoding matrix, and $W_{C,i}$ is generated by multiplying the reordered matrix and the diagonal matrix, the rotated precoding matrix $W_{RBD,i}$ may be given by:

$$W_{RBD,i} = \frac{1}{2} U_{rot} W_{C,i} \quad \text{[Equation 21]}$$

By using Equation 21, the rotated preceding matrix $W_{RBD,i}$ with respect to $W_{C,i}$ included in Equation 20 may be represented as follows:

$$W_{RBD,1} = \frac{1}{2} U_{rot} W_{C,1} \quad \text{[Equation 22]}$$
$$= \frac{1}{2} \begin{bmatrix} 1 & 0 & -1 & 0 \\ 0 & 1 & 0 & -1 \\ 1 & 0 & 1 & 0 \\ 0 & 1 & 0 & 1 \end{bmatrix} \begin{bmatrix} 1 & 0 & 1 & 0 \\ 1 & 0 & -1 & 0 \\ 0 & -1 & 0 & -1 \\ 0 & -1 & 0 & 1 \end{bmatrix},$$

$$W_{RBD,2} = \frac{1}{2} U_{rot} W_{C,2}$$
$$= \frac{1}{2} \begin{bmatrix} 1 & 0 & -1 & 0 \\ 0 & 1 & 0 & -1 \\ 1 & 0 & 1 & 0 \\ 0 & 1 & 0 & 1 \end{bmatrix} \begin{bmatrix} 0 & 1 & 0 & -1 \\ 0 & 1 & 0 & 1 \\ -1 & 0 & 1 & 0 \\ -1 & 0 & -1 & 0 \end{bmatrix},$$

$$W_{RBD,3} = \frac{1}{2} U_{rot} W_{C,3}$$
$$= \frac{1}{2} \begin{bmatrix} 1 & 0 & -1 & 0 \\ 0 & 1 & 0 & -1 \\ 1 & 0 & 1 & 0 \\ 0 & 1 & 0 & 1 \end{bmatrix} \begin{bmatrix} 1 & 0 & 1 & 0 \\ j & 0 & -j & 0 \\ 0 & j & 0 & j \\ 0 & -1 & 0 & 1 \end{bmatrix},$$

$$W_{RBD,4} = \frac{1}{2} U_{rot} W_{C,4}$$
$$= \frac{1}{2} \begin{bmatrix} 1 & 0 & -1 & 0 \\ 0 & 1 & 0 & -1 \\ 1 & 0 & 1 & 0 \\ 0 & 1 & 0 & 1 \end{bmatrix} \begin{bmatrix} 0 & j & 0 & -j \\ 0 & 1 & 0 & 1 \\ -1 & 0 & 1 & 0 \\ j & 0 & j & 0 \end{bmatrix},$$

Referring to Equation 22, when transmitting antennas corresponding to one polarization direction are installed in a direction of +45 degrees with respect to the reference plane and transmitting antennas corresponding to another polarization direction are installed in a direction of −45 degrees with respect to the reference plane, four (4) rotated preceding matrices may be generated using the rotated matrix. In this instance, although four rotated preceding matrices are expressed in Equation 22, it will be apparent to those of ordinary skills in the art that various types of rotated precoding matrices may be generated using the technical spirits of the present invention.

Also, the rotated preceding matrix $W_{RBD,i}$ may be represented as follows:

$$W_{RBD,5} = \frac{1}{2} U_{rot} W_{C,5} \quad \text{[Equation 23]}$$
$$= \frac{1}{2} \begin{bmatrix} 1 & 0 & -1 & 0 \\ 0 & 1 & 0 & -1 \\ 1 & 0 & 1 & 0 \\ 0 & 1 & 0 & 1 \end{bmatrix} \begin{bmatrix} 0 & -j & 0 & j \\ 0 & 1 & 0 & 1 \\ -1 & 0 & 1 & 0 \\ -j & 0 & -j & 0 \end{bmatrix},$$

$$W_{RBD,6} = \frac{1}{2} U_{rot} W_{C,6}$$
$$= \frac{1}{2} \begin{bmatrix} 1 & 0 & -1 & 0 \\ 0 & 1 & 0 & -1 \\ 1 & 0 & 1 & 0 \\ 0 & 1 & 0 & 1 \end{bmatrix} \begin{bmatrix} 1 & 0 & 1 & 0 \\ -1 & 0 & 1 & 0 \\ 0 & 1 & 0 & 1 \\ 0 & -1 & 0 & 1 \end{bmatrix},$$

$$W_{RBD,7} = \frac{1}{2} U_{rot} W_{C,7}$$
$$= \frac{1}{2} \begin{bmatrix} 1 & 0 & -1 & 0 \\ 0 & 1 & 0 & -1 \\ 1 & 0 & 1 & 0 \\ 0 & 1 & 0 & 1 \end{bmatrix} \begin{bmatrix} 0 & -1 & 0 & 1 \\ 0 & 1 & 0 & 1 \\ -1 & 0 & 1 & 0 \\ 1 & 0 & 1 & 0 \end{bmatrix},$$

-continued $$W_{RBD,8} = \frac{1}{2} U_{rot} W_{C,8}$$

$$= \frac{1}{2} \begin{bmatrix} 1 & 0 & -1 & 0 \\ 0 & 1 & 0 & -1 \\ 1 & 0 & 1 & 0 \\ 0 & 1 & 0 & 1 \end{bmatrix} \begin{bmatrix} 1 & 0 & 1 & 0 \\ -j & 0 & j & 0 \\ 0 & -j & 0 & -j \\ 0 & -1 & 0 & 1 \end{bmatrix}.$$

When calculating the rotated preceding matrix $W_{RBD,i}$ using Equation 22 and Equation 23, it may be represented as follows:

[Equation 24]

$$W_{RBD,1} = \frac{1}{2} U_{rot} W_{C,1} = \frac{1}{2} \begin{bmatrix} 1 & 1 & 1 & 1 \\ 1 & 1 & -1 & -1 \\ 1 & -1 & 1 & -1 \\ 1 & -1 & -1 & 1 \end{bmatrix},$$

$$W_{RBD,2} = \frac{1}{2} U_{rot} W_{C,2} = \frac{1}{2} \begin{bmatrix} 1 & 1 & -1 & -1 \\ 1 & 1 & 1 & 1 \\ -1 & 1 & 1 & -1 \\ -1 & 1 & -1 & 1 \end{bmatrix},$$

$$W_{RBD,3} = \frac{1}{2} U_{rot} W_{C,3} = \frac{1}{2} \begin{bmatrix} 1 & -j & 1 & -j \\ j & 1 & -j & -1 \\ 1 & j & 1 & j \\ j & -1 & -j & 1 \end{bmatrix},$$

$$W_{RBD,4} = \frac{1}{2} U_{rot} W_{C,4} = \frac{1}{2} \begin{bmatrix} 1 & j & -1 & -j \\ -j & 1 & -j & 1 \\ -1 & j & 1 & -j \\ j & 1 & j & 1 \end{bmatrix},$$

$$W_{RBD,5} = \frac{1}{2} U_{rot} W_{C,5} = \frac{1}{2} \begin{bmatrix} 1 & -j & -1 & j \\ j & 1 & j & 1 \\ -1 & -j & 1 & j \\ -j & 1 & -j & 1 \end{bmatrix},$$

$$W_{RBD,6} = \frac{1}{2} U_{rot} W_{C,6} = \frac{1}{2} \begin{bmatrix} 1 & -1 & 1 & -1 \\ -1 & 1 & 1 & -1 \\ 1 & 1 & 1 & 1 \\ -1 & -1 & 1 & 1 \end{bmatrix},$$

$$W_{RBD,7} = \frac{1}{2} U_{rot} W_{C,7} = \frac{1}{2} \begin{bmatrix} 1 & -1 & -1 & 1 \\ -1 & 1 & -1 & 1 \\ -1 & -1 & 1 & 1 \\ 1 & 1 & 1 & 1 \end{bmatrix},$$

$$W_{RBD,8} = \frac{1}{2} U_{rot} W_{C,8} = \frac{1}{2} \begin{bmatrix} 1 & j & 1 & j \\ -j & 1 & j & -1 \\ 1 & -j & 1 & -j \\ -j & -1 & j & 1 \end{bmatrix}.$$

Accordingly, various types of communication apparatuses transmitting/receiving data according to a space-division multiple access (SDMA) scheme can perform communication using at least one of the precoding matrices disclosed in Equation 24. SDMA denotes a technology that enables a base station to transmit (or receive) signal (i.e., at least one data stream) to (or from) multiple users in the same bandwidth and time simultaneously, via multiple antennas in order to maximize a data transmission rate and total capacity. Here, the preceding matrices disclosed in Equation 24 are based on when a transmission rank is 4, but it is possible to generate preceding matrices corresponding to various types of transmission ranks by selecting column vectors of the preceding matrices disclosed in Equation 24.

Also, the base station (BS) and terminals may store the codebook of matrices of Equation 24 in a computer-readable recording medium, etc. When the base station (BS) transmits a pilot signal, each of the terminals may select any one of the stored matrices in response to the pilot signal. In this instance, each of the terminals may select any one matrix based on the state of a wireless channel formed between each of the terminals and the base station, and also may select any one matrix based on an achievable data transmission rate. Also, each of the terminals may select any one color vector from column vectors included in the selected matrix.

Also, the terminals may feed back to the base station information associated with the selected matrix, or information associated with the selected column vector. The information associated with the selected matrix may be index information of the selected matrix and the information associated with the selected column vector may be index information of the selected column vector.

In this instance, the base station (BS) may select any one of the matrices disclosed in Equation 24, as a preceding matrix, based on the information fed back from the terminals. In particular, the base station may select the preceding matrix according to a Per-User Unitary Rate Control (PU2RC) scheme. The base station (BS) may perform precoding (beam-forming) on a data stream to be transmitted, via transmitting antennas, using the selected preceding matrix.

Specifically, a terminal according to an aspect of the present invention may include a signal receiver to receive a pilot signal transmitted from a base station; a codebook storage unit to store a codebook including at least one $W_i$ where i is a natural number of 1 through 8:

$$W_1 = \frac{1}{2} \begin{bmatrix} 1 & 1 & 1 & 1 \\ 1 & 1 & -1 & -1 \\ 1 & -1 & 1 & -1 \\ 1 & -1 & -1 & 1 \end{bmatrix}, W_2 = \frac{1}{2} \begin{bmatrix} 1 & 1 & -1 & -1 \\ 1 & 1 & 1 & 1 \\ -1 & 1 & 1 & -1 \\ -1 & 1 & -1 & 1 \end{bmatrix},$$

$$W_3 = \frac{1}{2} \begin{bmatrix} 1 & -j & 1 & -j \\ j & 1 & -j & -1 \\ 1 & j & 1 & j \\ j & -1 & -j & 1 \end{bmatrix}, W_4 = \frac{1}{2} \begin{bmatrix} 1 & j & -1 & -j \\ -j & 1 & -j & 1 \\ -1 & j & 1 & -j \\ j & 1 & j & 1 \end{bmatrix},$$

$$W_5 = \frac{1}{2} \begin{bmatrix} 1 & -j & -1 & j \\ j & 1 & j & 1 \\ -1 & -j & 1 & j \\ -j & 1 & -j & 1 \end{bmatrix}, W_6 = \frac{1}{2} \begin{bmatrix} 1 & -1 & 1 & -1 \\ -1 & 1 & 1 & -1 \\ 1 & 1 & 1 & 1 \\ -1 & -1 & 1 & 1 \end{bmatrix},$$

$$W_7 = \frac{1}{2} \begin{bmatrix} 1 & -1 & -1 & 1 \\ -1 & 1 & -1 & 1 \\ -1 & -1 & 1 & 1 \\ 1 & 1 & 1 & 1 \end{bmatrix}, W_8 = \frac{1}{2} \begin{bmatrix} 1 & j & 1 & j \\ -j & 1 & j & -1 \\ 1 & -j & 1 & -j \\ -j & -1 & j & 1 \end{bmatrix};$$

a selector to select a target matrix from the stored at least one $W_i$ in response to the pilot signal; and an information feedback unit to feed back information associated with the target matrix to the base station.

For instance, the selector may select the target matrix from the stored codebook including at least one $W_i$ based on the state of a wireless channel formed between the terminal and the base station. Also, the selector may select the target matrix from the stored codebook including at least one $W_i$ based on an achievable data transmission rate. In addition, the selector may select the target matrix from the stored codebook including at least one $W_i$ in response to the pilot signal, and select at least one column vector from column vectors included in the selected target matrix. In this instance, the information feedback unit may feed back to the base station information associated with the selected target matrix and information associated with the selected at least one column vector.

Also, a base station according to an aspect of the present invention may include a codebook storage unit arranged to store a codebook including at least one $W_i$ where i is a natural number of 1 through 8:

$$W_1 = \frac{1}{2}\begin{bmatrix} 1 & 1 & 1 & 1 \\ 1 & 1 & -1 & -1 \\ 1 & -1 & 1 & -1 \\ 1 & -1 & -1 & 1 \end{bmatrix}, W_2 = \frac{1}{2}\begin{bmatrix} 1 & 1 & -1 & -1 \\ 1 & 1 & 1 & 1 \\ -1 & 1 & 1 & -1 \\ -1 & 1 & -1 & 1 \end{bmatrix},$$

$$W_3 = \frac{1}{2}\begin{bmatrix} 1 & -j & 1 & -j \\ j & 1 & -j & -1 \\ 1 & j & 1 & j \\ j & -1 & -j & 1 \end{bmatrix}, W_4 = \frac{1}{2}\begin{bmatrix} 1 & j & -1 & -j \\ -j & 1 & -j & 1 \\ -1 & j & 1 & -j \\ j & 1 & j & 1 \end{bmatrix},$$

$$W_5 = \frac{1}{2}\begin{bmatrix} 1 & -j & -1 & j \\ j & 1 & j & 1 \\ -1 & -j & 1 & j \\ -j & 1 & -j & 1 \end{bmatrix}, W_6 = \frac{1}{2}\begin{bmatrix} 1 & -1 & 1 & -1 \\ -1 & 1 & 1 & -1 \\ 1 & 1 & 1 & 1 \\ -1 & -1 & 1 & 1 \end{bmatrix},$$

$$W_7 = \frac{1}{2}\begin{bmatrix} 1 & -1 & -1 & 1 \\ -1 & 1 & -1 & 1 \\ -1 & -1 & 1 & 1 \\ 1 & 1 & 1 & 1 \end{bmatrix}, W_8 = \frac{1}{2}\begin{bmatrix} 1 & j & 1 & j \\ -j & 1 & j & -1 \\ 1 & -j & 1 & -j \\ -j & -1 & j & 1 \end{bmatrix};$$

an information receiver arranged to receive information associated with a matrix selected by a terminal from the stored codebook including at least one $W_i$, a matrix selector arranged to select a preceding matrix based on information associated with the selected matrix; and a precoder arranged to perform preceding on a data stream to be transmitted using the selected preceding matrix.

In this instance, the information receiver may receive information associated with matrices corresponding to a plurality of terminals, in which the matrices are selected by the plurality of terminals respectively. The matrix selector may then select the preceding matrix based on information associated with the matrices corresponding to the plurality of terminals.

Figure 5:
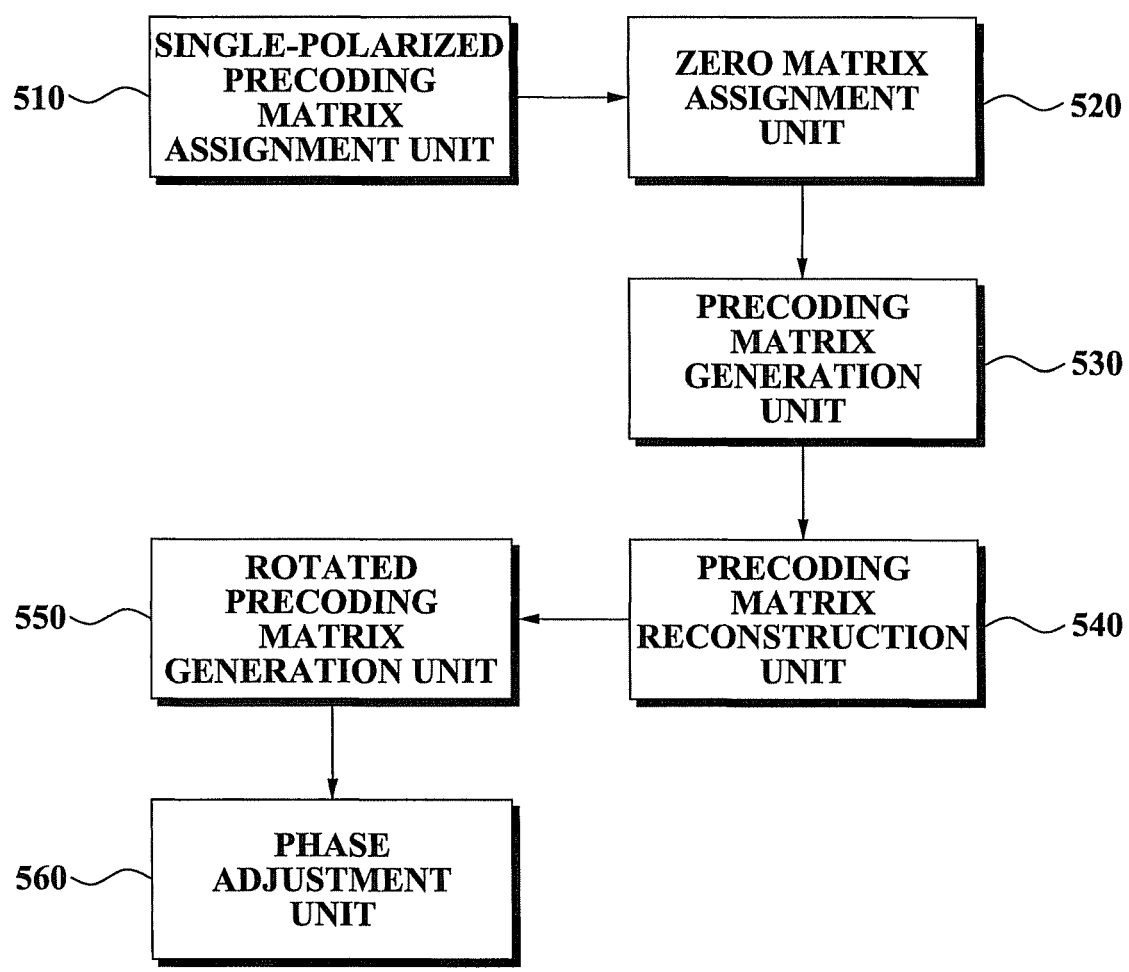
FIG. 5 is a block diagram illustrating a codebook generation apparatus for generating a codebook of precoding matrices for use in a multi-polarized MIMO system according to an example embodiment of the present invention.

Turning now to FIG. 5, a block diagram of a codebook generation apparatus for generating a codebook of preceding matrices for use in a multi-polarized MIMO system according to an example embodiment of the present invention is illustrated. Referring to FIG. 5, the codebook generation apparatus includes a single-polarized preceding matrix assignment unit 510, a zero matrix assignment unit 520, a preceding matrix generation unit 530, a preceding matrix reconstruction unit 540, a rotated preceding matrix generation unit 550, and a phase adjustment unit 560.

The single-polarized preceding matrix assignment unit 510 assigns a single-polarized preceding matrix to each of diagonal blocks among a plurality of blocks within a block diagonal structure. The blocks are organized according to a number of polarization directions of transmitting antennas.

The zero matrix assignment unit 520 assigns a zero matrix to remaining blocks excluding the diagonal blocks within the block diagonal structure.

The precoding matrix generation unit 530 generates a precoding matrix for multi-polarized MIMO (i.e., a block diagonal multi-polarized codebook) by combining the single-polarized preceding matrices assigned to the diagonal blocks and the zero matrices assigned to the remaining blocks within the block diagonal structure.

The precoding matrix reconstruction unit 540 reconstructs the precoding matrix by selecting, from the precoding matrix, at least one column vector according to a transmission rank corresponding to a number of data streams to be transmitted.

The rotated precoding matrix generation unit 550 generates a rotated precoding matrix using the preceding matrix and a rotated matrix corresponding to a rotated angle of the polarization direction when the polarization direction of transmitting antennas is rotated.

The rotated precoding matrix generation unit 550 may generate a reordered matrix by reordering column vectors that are included in the preceding matrix, and generates the rotated precoding matrix by using the reordered matrix and the rotated matrix.

The phase adjustment unit 560 adjusts a phase of each of elements included in the reordered matrix using a diagonal matrix.

Descriptions not made in relation to the apparatus of FIG. 5 will be the same as the descriptions made with reference to FIGS. 1 through 4, and thus will be omitted.

Matrices included in a precoding matrix (block diagonal multi-polarized codebook) that is generated according to an aspect of the present invention will be stored in various types of communication apparatuses and used. For example, a communication apparatus may transmit and receive data in a space division multiple access (SDMA) communication system by using a matrix that is generated according to an aspect of the present invention. The communication apparatus may include various types of devices for the SDMA communication system, such as a base station, a repeater, a terminal, and the like.

Specifically, a communication apparatus according to an aspect of the present invention may store a preceding matrix (block diagonal multi-polarized codebook) that is generated by assigning a single-polarized preceding matrix to diagonal blocks among a plurality of blocks within a block diagonal structure that are divided or organized according to the number of polarization directions of transmitting antennas, and assigning a zero matrix to remaining blocks excluding the diagonal blocks within the block diagonal structure.

According to an aspect of the present invention, the precoding matrix (block diagonal multi-polarized codebook) may be generated by combining the single-polarized preceding matrices assigned at diagonal blocks and the zero matrices assigned at remaining blocks within the block diagonal structure.

Also, a communication apparatus according to an aspect of the present invention may store a matrix that is reconstructed by selecting, from the precoding matrix, at least one column vector according to a transmission rank corresponding to a number of data streams to be transmitted.

Also, a communication apparatus according to an aspect of the present invention may store a rotated preceding matrix that is generated using the preceding matrix and a rotated matrix corresponding to a rotated angle of the polarization direction when the polarization direction of transmitting antennas is rotated.

Also, a communication apparatus according to an example embodiment of the present invention may generate a reordered matrix by reordering column vectors that are included in the preceding matrix, and store a matrix that is generated by using the reordered matrix and the rotated matrix.

When the communication apparatus is a base station (BS) used to support multiple user equipments (UEs) in a wireless network, such as 3GPP, Super 3G (3G Long Term Evolution "LTE"), 3GPP2 and upcoming 4G systems, the base station (BS) may transmit a transmission signal that beam forms a data stream using matrices included in the base station (BS). Specifically, the base station (BS) may include a codebook storage unit that stores a codebook of matrices according to the present invention and a beamformer that beam forms data streams using the stored matrices.

Conversely, when the communication apparatus is a terminal, the terminal may generate feedback data using matrices selected from a codebook stored in the terminal. The feedback data is used when the base station (BS) performs beamforming in which multiple data streams are emitted from transmitting antennas in accordance with matrices selected from a codebook stored in the terminal. Specifically, the terminal may include a codebook storage unit that stores a codebook of matrices according to the present invention and a feedback data generation unit that generates feedback data corresponding to a wireless channel of the base station using the stored matrices.

According to aspects of the present invention, there is provided a method and apparatus for generating a codebook for a multi-polarized MIMO system that can generate a preceding matrix using a single-polarized preceding matrix even when the polarization of antennas is multi-polarization, and thereby generate an excellent preceding matrix that is easily generated. Such a codebook can be shared by a transmitter end and a receiver end.

Also, according to aspects of the present invention, there is provided a method and apparatus for generating a codebook in a multi-polarized MIMO system that can reconstruct a preceding matrix according to a transmission rank and thereby can more effectively generate a codebook.

Also, according to aspects of the present invention, there is provided a method and apparatus for generating a codebook in a multi-polarized MIMO system that can generate a rotated matrix when the polarization direction of transmitting antennas is rotated, and thereby can more flexibly cope with a change in the polarization direction.

As described from the foregoing, a codebook with low complexity and excellent performance and robustness can advantageously be obtained for use in multi-polarized MIMO schemes. Such codebook design can also be used for single-polarized MIMO schemes without any significant performance degradation.

Various components of the codebook generation apparatus, as shown in FIG. 5, such as, the single-polarized precoding matrix assignment unit 510, the zero matrix assignment unit 520, the preceding matrix generating unit 530, the precoding matrix reconstruction unit 540, the rotate preceding matrix generation unit 550 and the phase adjustment unit 560 can be integrated into a single control unit, such as a baseband processor or controller located at a transmitter side, for example, a base station, or alternatively, can be implemented in software or hardware, such as, for example, a field programmable gate array (FPGA) and an application specific integrated circuit (ASIC). As such, it is intended that the processes described herein be broadly interpreted as being equivalently performed by software, hardware, or a combination thereof. As previously discussed, software modules can be written, via a variety of software languages, including C, C++, Java, Visual Basic, and many others. These software modules may include data and instructions which can also be stored on one or more machine-readable storage media, such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact discs (CDs) or digital video discs (DVDs). Instructions of the software routines or modules may also be loaded or transported into the wireless cards or any computing devices on the wireless network in one of many different ways. For example, code segments including instructions stored on floppy discs, CD or DVD media, a hard disk, or transported through a network interface card, modem, or other interface device may be loaded into the system and executed as corresponding software routines or modules. In the loading or transport process, data signals that are embodied as carrier waves (transmitted over telephone lines, network lines, wireless links, cables, and the like) may communicate the code segments, including instructions, to the network node or element. Such carrier waves may be in the form of electrical, optical, acoustical, electromagnetic, or other types of signals.

In addition, the codebook generating method as shown in FIG. 2 may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, and the like, including a carrier wave transmitting signals specifying the program instructions, data structures, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

While there have been illustrated and described what are considered to be example embodiments of the present invention, it will be understood by those skilled in the art and as technology develops that various changes and modifications, may be made, and equivalents may be substituted for elements thereof without departing from the true scope of the present invention. Many modifications, permutations, additions and sub-combinations may be made to adapt the teachings of the present invention to a particular situation without departing from the scope thereof. For example, the antenna arrangement, shown in FIGS. 1A-1C, typically includes a transmitter side provided with transmitting antennas $X_1 \ldots X_M$ and a receiver side provided with N receiver antennas $Y_1 \ldots Y_N$ to communicate, via a wireless channel (channel matrix H). For mobile communication systems, a base station (BS), known as "Node-B" as specified in accordance with 3GPP, 3GPP2 and 4G specifications, is used at the transmitter end to transmit data, via wireless channels. User equipments (UEs), typically mobile stations (MS), are used at the receiver end to receive data, via the wireless channels. Such user equipments (UE) can be, for example, mobile phones (handsets), personal digital assistants (PDAs), or other devices such as wireless cards in laptop computers or computers with internet wireless connectivity, WiFi and WiMAX gadgets etc. The wireless network can be that of any of the wireless communication technologies, including, but not limited to GSM (Global System for Mobile Communications), CDMA (Code Division Multiple Access), WLL (Wireless Local Loop), WAN (Wide Area Network), WiFi, and WiMAX (Worldwide Interoperability for Microwave Access based on IEEE 802.16 standards), and is applicable with many existing and emerging wireless standards such as IEEE 802.11 (for wireless local area networks), IEEE 802.16 (for wireless metropolitan area networks) and IEEE 802.02 (for mobile broadband wireless access). The base station (BS) can also be an IEEE 802.11 access point (AP) and the UE can also be any client station. Alternatively, the base station can also be implemented with a GERAN (GSM/EDGE radio access technology) in a UTRAN (UMTS Terrestrial Radio Access Network) using a wideband code division multiple access (WCDMA) technology. However, the invention is not limited to those radio access technologies, but it can also be applied to the following radio access technologies: GSM (Global System for Mobile Communications), GPRS (General Packet Radio Service), E-GPRS (EDGE GPRS), CDMA2000 (CDMA, Code Division Multiple Access), US-TDMA (US Time Division Multiple Access), and IS-95. Accordingly, it is intended, therefore, that the present invention not be limited to the various example embodiments disclosed, but that the present invention includes all embodiments falling within the scope of the appended claims.

What is claimed is:

1. A method of generating a codebook used in a multiple-input and multiple-output (MIMO) system, the method comprising:
    assigning a single-polarized precoding matrix to each of diagonal blocks among a plurality of blocks arranged in a block diagonal structure in which a number of diagonal blocks corresponds to a number of polarization directions of transmitting antennas;
    assigning a zero matrix to each of remaining blocks excluding the diagonal blocks within the block diagonal structure; and
    generating a precoding matrix by combining the single-polarized precoding matrices assigned to the diagonal blocks and the zero matrices assigned the remaining blocks within the block diagonal structure.

2. The method as claimed in claim 1, further comprising:
    reconstructing the precoding matrix by selecting, from the precoding matrix, at least one column vector according to a transmission rank corresponding to a number of data streams to be transmitted.

3. The method as claimed in claim 2, wherein the precoding matrix is reconstructed by selecting R column vectors when the transmission rank is R.

4. The method as claimed in claim 1, wherein the single-polarized precoding matrix is one of a discrete Fourier transform (DFT) precoding matrix and a rotated DFT precoding matrix designed for single-polarized MIMO.

5. The method as claimed in claim 1, wherein, when the number of polarization directions is greater than or equal to 2, the polarization directions are orthogonal to each other.

6. The method as claimed in claim 1, wherein the size of the single-polarized precoding matrix assigned to each of the diagonal blocks is determined according to the number of transmitting antennas that have the same polarization direction.

7. The method as claimed in claim 1, further comprising:
    generating a rotated precoding matrix using the precoding matrix and a rotated matrix corresponding to a rotated angle of the polarization direction when the polarization direction of transmitting antennas is rotated.

8. The method as claimed in claim 7, wherein the reordered matrix is obtained by reordering column vectors that are included in the precoding matrix.

9. The method as claimed in claim 7, wherein the rotated precoding matrix is obtained by multiplying the precoding matrix and the rotated matrix.

10. The method as claimed in claim 8, further comprising:
    adjusting a phase of each of elements included in the reordered matrix using a diagonal matrix.

11. A computer-readable medium storing a program for implementing the method of claim 1.

12. An apparatus configured to generate a codebook used in a multiple-input and multiple-output (MIMO) system, the apparatus comprising:
    a single-polarized precoding matrix assignment unit configured to assign a single-polarized precoding matrix to diagonal blocks among a plurality of blocks arranged in a block diagonal format in which a number of diagonal blocks corresponds to a number of polarization directions of transmitting antennas;
    a zero matrix assignment unit configured to assign a zero matrix to remaining blocks excluding the diagonal blocks; and
    a precoding matrix generation unit configured to generate a precoding matrix by combining the single-polarized precoding matrices assigned to the diagonal blocks and the zero matrices assigned to the remaining blocks.

13. The apparatus as claimed in claim 12, further comprising:
    a precoding matrix reconstruction unit configured to reconstruct the precoding matrix by selecting, from the precoding matrix, at least one column vector according to a transmission rank corresponding to a number of data streams to be transmitted.

14. The apparatus as claimed in claim 12, wherein the single-polarized precoding matrix is one of a DFT precoding matrix and a rotated DFT precoding matrix for single-polarized MIMO.

15. The apparatus as claimed in claim 12, further comprising:
    a rotated precoding matrix generation unit configured to generate a rotated precoding matrix using the precoding matrix and a rotated matrix corresponding to a rotated angle of the polarization direction when the polarization direction of transmitting antennas is rotated.

16. The apparatus as claimed in claim 15, wherein the rotated precoding matrix generation unit generates a reordered matrix by reordering orders of column vectors that are included in the precoding matrix, and generates the rotated precoding matrix by using the reordered matrix and the rotated matrix.

17. The apparatus as claimed in claim 16, further comprising:
    a phase adjustment unit configured to adjust a phase of each of elements included in the reordered matrix using a diagonal matrix.

18. A communication apparatus, comprising:
    a plurality of transmitting antennas; and
    a processor arranged to transmit data, via the transmitting antennas, using a precoding matrix generated by assigning a single-polarized precoding matrix to diagonal blocks among a plurality of blocks arranged in a block diagonal format in which a number of diagonal blocks corresponds to a number of polarization directions of the transmitting antennas, and by assigning a zero matrix to remaining blocks excluding the diagonal blocks,
wherein the precoding matrix is generated by combining the single-polarized precoding matrices assigned to the diagonal blocks and the zero matrices assigned to the remaining blocks.

19. The communication apparatus as claimed in claim 18, further comprising a storage configured to store at least one of the precoding matrix and a matrix that is reconstructed by selecting, from the precoding matrix, at least one column vector according to a transmission rank corresponding to a number of data streams to be transmitted, via the transmitting antennas.

20. The communication apparatus as claimed in claim 19, wherein the storage further stores at least one of the precoding matrix, the reconstructed matrix, and a rotated precoding matrix that is generated using the precoding matrix and a rotated matrix corresponding to a rotated angle of the polarization direction when the polarization direction of the transmitting antennas is rotated.

21. The communication apparatus as claimed in claim 20, wherein the storage further stores at least one of the precoding matrix, the reconstructed matrix, the rotated precoding matrix, and a matrix that is generated by using a reordered matrix and the rotated matrix, wherein the reordered matrix is generated by reordering column vectors that are included in the precoding matrix.

22. The communication apparatus as claimed in claim 21, wherein the storage further stores at least one of the precoding matrix, the reconstructed matrix, the rotated precoding matrix, the matrix that is generated using the reordered matrix and the rotated matrix, and another matrix that is generated by adjusting a phase of each of elements included in the reordered matrix using a diagonal matrix.

23. A terminal comprising:
a codebook storage unit configured to store a codebook including at least one $W_i$ where i is a natural number of 1 through 8:

$$W_1 = \frac{1}{2}\begin{bmatrix} 1 & 1 & 1 & 1 \\ 1 & 1 & -1 & -1 \\ 1 & -1 & 1 & -1 \\ 1 & -1 & -1 & 1 \end{bmatrix}, W_2 = \frac{1}{2}\begin{bmatrix} 1 & 1 & -1 & -1 \\ 1 & 1 & 1 & 1 \\ -1 & 1 & 1 & -1 \\ -1 & 1 & -1 & 1 \end{bmatrix},$$

$$W_3 = \frac{1}{2}\begin{bmatrix} 1 & -j & 1 & -j \\ j & 1 & -j & -1 \\ 1 & j & 1 & j \\ j & -1 & -j & 1 \end{bmatrix}, W_4 = \frac{1}{2}\begin{bmatrix} 1 & j & -1 & -j \\ -j & 1 & -j & 1 \\ -1 & j & 1 & -j \\ j & 1 & j & 1 \end{bmatrix},$$

$$W_5 = \frac{1}{2}\begin{bmatrix} 1 & -j & -1 & j \\ j & 1 & j & 1 \\ -1 & -j & 1 & j \\ -j & 1 & -j & 1 \end{bmatrix}, W_6 = \frac{1}{2}\begin{bmatrix} 1 & -1 & 1 & -1 \\ -1 & 1 & 1 & -1 \\ 1 & 1 & 1 & 1 \\ -1 & -1 & 1 & 1 \end{bmatrix},$$

$$W_7 = \frac{1}{2}\begin{bmatrix} 1 & -1 & -1 & 1 \\ -1 & 1 & -1 & 1 \\ -1 & -1 & 1 & 1 \\ 1 & 1 & 1 & 1 \end{bmatrix}, W_8 = \frac{1}{2}\begin{bmatrix} 1 & j & 1 & j \\ -j & 1 & j & -1 \\ 1 & -j & 1 & -j \\ -j & -1 & j & 1 \end{bmatrix};$$

a selector configured to select a target matrix from the stored at least one $W_i$; and an information feedback unit configured to feed back information associated with the target matrix to a base station.

24. The terminal as claimed in claim 23, wherein the selector selects the target matrix from the stored codebook including at least one $W_i$ based on the state of a wireless channel formed between the terminal and the base station.

25. The terminal as claimed in claim 23, wherein the selector selects the target
matrix from the stored codebook including at least one $W_i$ based on an achievable data transmission rate.

26. The terminal as claimed in claim 23, wherein $W_i$ is a rotated precoding matrix.

27. The terminal as claimed in claim 23, wherein the selector selects the target matrix from the stored codebook including at least one $W_i$, and selects at least one column vector from column vectors included in the selected target matrix, and
the information feedback unit feeds back to the base station information associated with the selected target matrix and information associated with the selected at least one column vector.

28. The terminal as claimed in claim 27, wherein the information feedback unit feeds back to the base station index information of the selected target matrix and index information of the selected at least one column vector.

29. A method of operating a terminal, comprising:
receiving a pilot signal transmitted from a base station storing a cookbook including at least one $W_i$ where i is a natural number of 1 through 8:

$$W_1 = \frac{1}{2}\begin{bmatrix} 1 & 1 & 1 & 1 \\ 1 & 1 & -1 & -1 \\ 1 & -1 & 1 & -1 \\ 1 & -1 & -1 & 1 \end{bmatrix}, W_2 = \frac{1}{2}\begin{bmatrix} 1 & 1 & -1 & -1 \\ 1 & 1 & 1 & 1 \\ -1 & 1 & 1 & -1 \\ -1 & 1 & -1 & 1 \end{bmatrix},$$

$$W_3 = \frac{1}{2}\begin{bmatrix} 1 & -j & 1 & -j \\ j & 1 & -j & -1 \\ 1 & j & 1 & j \\ j & -1 & -j & 1 \end{bmatrix}, W_4 = \frac{1}{2}\begin{bmatrix} 1 & j & -1 & -j \\ -j & 1 & -j & 1 \\ -1 & j & 1 & -j \\ j & 1 & j & 1 \end{bmatrix},$$

$$W_5 = \frac{1}{2}\begin{bmatrix} 1 & -j & -1 & j \\ j & 1 & j & 1 \\ -1 & -j & 1 & j \\ -j & 1 & -j & 1 \end{bmatrix}, W_6 = \frac{1}{2}\begin{bmatrix} 1 & -1 & 1 & -1 \\ -1 & 1 & 1 & -1 \\ 1 & 1 & 1 & 1 \\ -1 & -1 & 1 & 1 \end{bmatrix},$$

$$W_7 = \frac{1}{2}\begin{bmatrix} 1 & -1 & -1 & 1 \\ -1 & 1 & -1 & 1 \\ -1 & -1 & 1 & 1 \\ 1 & 1 & 1 & 1 \end{bmatrix}, W_8 = \frac{1}{2}\begin{bmatrix} 1 & j & 1 & j \\ -j & 1 & j & -1 \\ 1 & -j & 1 & -j \\ -j & -1 & j & 1 \end{bmatrix};$$

selecting a target matrix from the stored codebook including at least one $W_i$ in response to the pilot signal; and
feeding back information associated with the target matrix to the base station.

30. A base station comprising:
a codebook storage unit to store a codebook including at least one $W_i$ where i is a natural number of 1 through 8:

$$W_1 = \frac{1}{2}\begin{bmatrix} 1 & 1 & 1 & 1 \\ 1 & 1 & -1 & -1 \\ 1 & -1 & 1 & -1 \\ 1 & -1 & -1 & 1 \end{bmatrix}, W_2 = \frac{1}{2}\begin{bmatrix} 1 & 1 & -1 & -1 \\ 1 & 1 & 1 & 1 \\ -1 & 1 & 1 & -1 \\ -1 & 1 & -1 & 1 \end{bmatrix},$$

$$W_3 = \frac{1}{2}\begin{bmatrix} 1 & -j & 1 & -j \\ j & 1 & -j & -1 \\ 1 & j & 1 & j \\ j & -1 & -j & 1 \end{bmatrix}, W_4 = \frac{1}{2}\begin{bmatrix} 1 & j & -1 & -j \\ -j & 1 & -j & 1 \\ -1 & j & 1 & -j \\ j & 1 & j & 1 \end{bmatrix},$$

$$W_5 = \frac{1}{2}\begin{bmatrix} 1 & -j & -1 & j \\ j & 1 & j & 1 \\ -1 & -j & 1 & j \\ -j & 1 & -j & 1 \end{bmatrix}, W_6 = \frac{1}{2}\begin{bmatrix} 1 & -1 & 1 & -1 \\ -1 & 1 & 1 & -1 \\ 1 & 1 & 1 & 1 \\ -1 & -1 & 1 & 1 \end{bmatrix},$$

$$W_7 = \frac{1}{2}\begin{bmatrix} 1 & -1 & -1 & 1 \\ -1 & 1 & -1 & 1 \\ -1 & -1 & 1 & 1 \\ 1 & 1 & 1 & 1 \end{bmatrix}, W_8 = \frac{1}{2}\begin{bmatrix} 1 & j & 1 & j \\ -j & 1 & j & -1 \\ 1 & -j & 1 & -j \\ -j & -1 & j & 1 \end{bmatrix};$$

an information receiver to receive information associated with a matrix selected by a terminal from the stored codebook including at least one $W_i$;

a matrix selector to select a precoding matrix based on information associated with the selected matrix; and a precoder to perform precoding on a data stream to be transmitted using the selected precoding matrix.

31. The base station as claimed in claim 30, wherein:

the information receiver receives information associated with matrices corresponding to a plurality of terminals, in which the matrices are selected by the plurality of terminals respectively, and the matrix selector selects the precoding matrix based on information associated with the matrices corresponding to the plurality of terminals.

32. The base station as claimed in claim 31, wherein the matrix selector selects the precoding matrix according to a Per-User Unitary Rate Control (PU2RC) scheme.

33. A method of operating a base station, comprising:

storing a codebook including at least one $W_i$ where i is a natural number of 1 through 8:

$$W_1 = \frac{1}{2}\begin{bmatrix} 1 & 1 & 1 & 1 \\ 1 & 1 & -1 & -1 \\ 1 & -1 & 1 & -1 \\ 1 & -1 & -1 & 1 \end{bmatrix}, W_2 = \frac{1}{2}\begin{bmatrix} 1 & 1 & -1 & -1 \\ 1 & 1 & 1 & 1 \\ -1 & 1 & 1 & -1 \\ -1 & 1 & -1 & 1 \end{bmatrix},$$

$$W_3 = \frac{1}{2}\begin{bmatrix} 1 & -j & 1 & -j \\ j & 1 & -j & -1 \\ 1 & j & 1 & j \\ j & -1 & -j & 1 \end{bmatrix}, W_4 = \frac{1}{2}\begin{bmatrix} 1 & j & -1 & -j \\ -j & 1 & -j & 1 \\ -1 & j & 1 & -j \\ j & 1 & j & 1 \end{bmatrix},$$

$$W_5 = \frac{1}{2}\begin{bmatrix} 1 & -j & -1 & j \\ j & 1 & j & 1 \\ -1 & -j & 1 & j \\ -j & 1 & -j & 1 \end{bmatrix}, W_6 = \frac{1}{2}\begin{bmatrix} 1 & -1 & 1 & -1 \\ -1 & 1 & 1 & -1 \\ 1 & 1 & 1 & 1 \\ -1 & -1 & 1 & 1 \end{bmatrix},$$

-continued $$W_7 = \frac{1}{2}\begin{bmatrix} 1 & -1 & -1 & 1 \\ -1 & 1 & -1 & 1 \\ -1 & -1 & 1 & 1 \\ 1 & 1 & 1 & 1 \end{bmatrix}, W_8 = \frac{1}{2}\begin{bmatrix} 1 & j & 1 & j \\ -j & 1 & j & -1 \\ 1 & -j & 1 & -j \\ -j & -1 & j & 1 \end{bmatrix};$$

selecting a precoding matrix from the stored codebook including at least one $W_i$; and performing precoding on a data stream to be transmitted using the selected precoding matrix.

34. A communication system comprising:

a terminal configured to store a codebook including at least one $W_i$ where i is a natural number of 1 through 8:

$$W_1 = \frac{1}{2}\begin{bmatrix} 1 & 1 & 1 & 1 \\ 1 & 1 & -1 & -1 \\ 1 & -1 & 1 & -1 \\ 1 & -1 & -1 & 1 \end{bmatrix}, W_2 = \frac{1}{2}\begin{bmatrix} 1 & 1 & -1 & -1 \\ 1 & 1 & 1 & 1 \\ -1 & 1 & 1 & -1 \\ -1 & 1 & -1 & 1 \end{bmatrix},$$

$$W_3 = \frac{1}{2}\begin{bmatrix} 1 & -j & 1 & -j \\ j & 1 & -j & -1 \\ 1 & j & 1 & j \\ j & -1 & -j & 1 \end{bmatrix}, W_4 = \frac{1}{2}\begin{bmatrix} 1 & j & -1 & -j \\ -j & 1 & -j & 1 \\ -1 & j & 1 & -j \\ j & 1 & j & 1 \end{bmatrix},$$

$$W_5 = \frac{1}{2}\begin{bmatrix} 1 & -j & -1 & j \\ j & 1 & j & 1 \\ -1 & -j & 1 & j \\ -j & 1 & -j & 1 \end{bmatrix}, W_6 = \frac{1}{2}\begin{bmatrix} 1 & -1 & 1 & -1 \\ -1 & 1 & 1 & -1 \\ 1 & 1 & 1 & 1 \\ -1 & -1 & 1 & 1 \end{bmatrix},$$

$$W_7 = \frac{1}{2}\begin{bmatrix} 1 & -1 & -1 & 1 \\ -1 & 1 & -1 & 1 \\ -1 & -1 & 1 & 1 \\ 1 & 1 & 1 & 1 \end{bmatrix}, W_8 = \frac{1}{2}\begin{bmatrix} 1 & j & 1 & j \\ -j & 1 & j & -1 \\ 1 & -j & 1 & -j \\ -j & -1 & j & 1 \end{bmatrix};$$

to select a target matrix from the stored codebook including at least one $W_i$ in response to a pilot signal, and to feed back information associated with the target matrix; and a base station configured to store at least one $W_k$ where k is a natural number of 1 through 8:

$$W_1 = \frac{1}{2}\begin{bmatrix} 1 & 1 & 1 & 1 \\ 1 & 1 & -1 & -1 \\ 1 & -1 & 1 & -1 \\ 1 & -1 & -1 & 1 \end{bmatrix}, W_2 = \frac{1}{2}\begin{bmatrix} 1 & 1 & -1 & -1 \\ 1 & 1 & 1 & 1 \\ -1 & 1 & 1 & -1 \\ -1 & 1 & -1 & 1 \end{bmatrix},$$

$$W_3 = \frac{1}{2}\begin{bmatrix} 1 & -j & 1 & -j \\ j & 1 & -j & -1 \\ 1 & j & 1 & j \\ j & -1 & -j & 1 \end{bmatrix}, W_4 = \frac{1}{2}\begin{bmatrix} 1 & j & -1 & -j \\ -j & 1 & -j & 1 \\ -1 & j & 1 & -j \\ j & 1 & j & 1 \end{bmatrix},$$

$$W_5 = \frac{1}{2}\begin{bmatrix} 1 & -j & -1 & j \\ j & 1 & j & 1 \\ -1 & -j & 1 & j \\ -j & 1 & -j & 1 \end{bmatrix}, W_6 = \frac{1}{2}\begin{bmatrix} 1 & -1 & 1 & -1 \\ -1 & 1 & 1 & -1 \\ 1 & 1 & 1 & 1 \\ -1 & -1 & 1 & 1 \end{bmatrix},$$

$$W_7 = \frac{1}{2}\begin{bmatrix} 1 & -1 & -1 & 1 \\ -1 & 1 & -1 & 1 \\ -1 & -1 & 1 & 1 \\ 1 & 1 & 1 & 1 \end{bmatrix}, W_8 = \frac{1}{2}\begin{bmatrix} 1 & j & 1 & j \\ -j & 1 & j & -1 \\ 1 & -j & 1 & -j \\ -j & -1 & j & 1 \end{bmatrix};$$

to receive information associated with the target matrix selected by the terminal select a precoding matrix from the stored codebook including at least one $W_k$, based on the information associated with the selected target matrix, and to perform precoding on a data stream to be transmitted using the selected precoding matrix.

35. A method of generating a codebook for use in a multiple-input and multiple-output (MIMO) system, the method comprising:
constructing a precoding matrix having a plurality of blocks arranged in rows and columns in which a number of diagonal blocks corresponds to a number of polarization directions of transmitting antennas;
assigning a single polarized precoding matrix to each of selected diagonal blocks among the plurality of blocks available within the precoding matrix; and
assigning a zero matrix to each of remaining blocks that are not selected diagonal blocks available within the precoding matrix,
wherein sizes of single polarized precoding matrices depend upon a transmission rank according to the number of transmitting antennas that have the same polarization direction.

36. The method as claimed in claim 35, wherein the single-polarized precoding matrix is one of a discrete Fourier transform (DFT) precoding matrix and a rotated DFT precoding matrix for single-polarized MIMO.

37. The method as claimed in claim 35, further comprising:
reconstructing the precoding matrix by selecting, from the precoding matrix, at least one column vector according to the transmission rank corresponding to a number of data streams to be transmitted;
generating a rotated precoding matrix by multiplying the precoding matrix and a rotated matrix corresponding to a rotated angle of the polarization direction when the polarization direction of transmitting antennas is rotated; and
adjusting a phase of each of elements included in the reordered matrix obtained by reordering column vectors that are included in the precoding matrix, using a diagonal matrix.

* * * * *